US005786132A

United States Patent [19]
Nohr et al.

[11] Patent Number: 5,786,132
[45] Date of Patent: Jul. 28, 1998

[54] PRE-DYES, MUTABLE DYE COMPOSITIONS, AND METHODS OF DEVELOPING A COLOR

[75] Inventors: Ronald Sinclair Nohr, Alpharetta; John Gavin MacDonald, Decatur, both of Ga.

[73] Assignee: Kimberly-Clark Corporation, Neenah, Wis.

[21] Appl. No.: 649,754

[22] Filed: May 29, 1996

Related U.S. Application Data

[63] Continuation-in-part of Ser. No. 463,187, Jun. 5, 1995, abandoned.

[51] Int. Cl.$^6$ .............................. G03C 1/73; G03C 5/16
[52] U.S. Cl. ........................ 430/343; 430/332; 430/338; 430/340; 552/128; 552/114; 548/479
[58] Field of Search .............................. 430/332, 338, 430/340, 343, 346; 503/200, 224; 552/114, 108; 548/478, 479

[56] References Cited

U.S. PATENT DOCUMENTS

| | | |
|---|---|---|
| Re. 28,225 | 11/1974 | Heseltine et al. |
| Re. 28,789 | 4/1976 | Chang . |
| 575,228 | 1/1897 | von Gallois . |
| 582,853 | 5/1897 | Feer . |
| 893,636 | 7/1908 | Maywald . |
| 1,013,544 | 1/1912 | Fuerth . |
| 1,325,971 | 12/1919 | Akashi . |
| 1,364,406 | 1/1921 | Olsen . |
| 1,436,856 | 11/1922 | Brenizer et al. |
| 1,744,149 | 1/1930 | Staehlin . |
| 1,803,906 | 5/1931 | Krieger et al. |
| 1,844,199 | 2/1932 | Bicknell et al. |
| 1,876,880 | 9/1932 | Drapal . |
| 1,880,572 | 10/1932 | Wendt et al. |
| 1,880,573 | 10/1932 | Wendt et al. |
| 1,916,350 | 7/1933 | Wendt et al. |
| 1,916,779 | 7/1933 | Wendt et al. |
| 1,955,898 | 4/1934 | Wendt et al. |
| 1,962,111 | 6/1934 | Bamberger . |
| 2,005,378 | 6/1935 | Kiel . |
| 2,005,511 | 6/1935 | Stoll et al. |
| 2,049,005 | 7/1936 | Gaspar . |
| 2,054,390 | 9/1936 | Rust et al. |
| 2,058,489 | 10/1936 | Murch et al. |
| 2,062,304 | 12/1936 | Gasper . |
| 2,090,511 | 8/1937 | Crossley et al. |
| 2,097,119 | 10/1937 | Eggert . |
| 2,106,539 | 1/1938 | Schnitzspahn . |
| 2,111,692 | 3/1938 | Saunders et al. |
| 2,125,015 | 7/1938 | Gasper . |
| 2,130,572 | 9/1938 | Wendt . |
| 2,132,154 | 10/1938 | Gasper . |
| 2,145,960 | 2/1939 | Wheatley et al. |
| 2,154,996 | 4/1939 | Rawling . |
| 2,159,280 | 5/1939 | Mannes et al. |
| 2,171,976 | 9/1939 | Erickson . |
| 2,181,800 | 11/1939 | Crossley et al. |

(List continued on next page.)

FOREIGN PATENT DOCUMENTS

| | | |
|---|---|---|
| 103085 | 4/1937 | Australia . |
| 12624/88 | 9/1988 | Australia . |
| 620075 | 5/1962 | Belgium . |
| 637169 | 3/1964 | Belgium . |
| 413257 | 10/1932 | Canada . |
| 458808 | 12/1936 | Canada . |
| 460268 | 10/1949 | Canada . |
| 461082 | 11/1949 | Canada . |
| 463021 | 2/1950 | Canada . |
| 463022 | 2/1950 | Canada . |
| 465495 | 5/1950 | Canada . |
| 465496 | 5/1950 | Canada . |
| 465499 | 5/1950 | Canada . |
| 483214 | 5/1952 | Canada . |
| 517364 | 10/1955 | Canada . |
| 537687 | 3/1957 | Canada . |
| 552565 | 2/1958 | Canada . |
| 571792 | 3/1959 | Canada . |
| 779239 | 2/1968 | Canada . |
| 930103 | 7/1973 | Canada . |
| 2053094 | 4/1992 | Canada . |

(List continued on next page.)

OTHER PUBLICATIONS

U.S. Patent application Ser. No. 08/103,503, filed Aug. 5, 1993.
U.S. Patent application Ser. No. 08/119,912, filed Sep. 10, 1993.
U.S. Patent application Ser. No. 08/183,683, filed Jan. 19, 1994.
U. S. Patent application Ser. No. 08/258,858, filed Jun. 13, 1994.
U.S. Patent application Ser. No. 08/268,685, filed Jun. 30, 1994.
U.S. Patent application Ser. No. 08/327,077, filed Oct. 21, 1994.
U.S. Patent application Ser. No. 08/336,813, filed Nov. 9, 1994.
U.S. Patent application Ser. No. 08/359,670, filed Dec. 20, 1994.
U.S. Patent application Ser. No. 08/360,501, filed Dec. 21, 1994.
U.S. Patent application Ser. No. 08/373,958, filed Jan. 17, 1995.
U.S. Patent application Ser. No. 08/393,089, filed Feb. 22, 1995.

(List continued on next page.)

*Primary Examiner*—John A. McPherson
*Attorney, Agent, or Firm*—Jones & Askew, LLP

[57] ABSTRACT

One embodiment of the present invention is a method and composition comprising a novel pre-dye molecule that is colorless and stable to ordinary light. The pre-dye molecule is capable of forming a color when exposed to certain wavelengths of electromagnetic radiation. A second embodiment of the present invention is a method of converting a conventional leuco dye to a colored composition by exposing the leuco dye admixed with a radiation transorber to certain wavelengths of electromagnetic radiation.

26 Claims, No Drawings

U.S. PATENT DOCUMENTS

| | | | |
|---|---|---|---|
| 2,185,153 | 12/1939 | Lecher et al. | |
| 2,220,178 | 11/1940 | Schneider. | |
| 2,230,590 | 2/1941 | Eggert et al. | |
| 2,237,885 | 4/1941 | Markush et al. | |
| 2,243,630 | 5/1941 | Houk et al. | |
| 2,268,324 | 12/1941 | Polgar. | |
| 2,281,895 | 5/1942 | van Poser et al. | |
| 2,328,166 | 8/1943 | Poigar et al. | |
| 2,346,090 | 4/1944 | Staehle. | |
| 2,349,090 | 5/1944 | Haddock. | |
| 2,356,618 | 8/1944 | Rossander et al. | |
| 2,361,301 | 10/1944 | Libby Jr. et al. | |
| 2,364,359 | 12/1944 | Kienle et al. | |
| 2,381,145 | 8/1945 | von Glahn et al. | |
| 2,382,904 | 8/1945 | Federsen. | |
| 2,386,646 | 10/1945 | Adams et al. | |
| 2,402,106 | 6/1946 | von Glahn et al. | |
| 2,416,145 | 2/1947 | Biro. | |
| 2,477,165 | 7/1949 | Bergstrom. | |
| 2,527,347 | 10/1950 | Bergstrom. | |
| 2,580,461 | 1/1952 | Pearl. | |
| 2,601,669 | 6/1952 | Tullsen. | |
| 2,612,494 | 9/1952 | von Glahn et al. | |
| 2,612,495 | 9/1952 | von Glahn et al. | |
| 2,628,959 | 2/1953 | von Glahn et al. | |
| 2,647,080 | 7/1953 | Joyce. | |
| 2,680,685 | 6/1954 | Ratchford. | |
| 2,728,784 | 12/1955 | Tholstrup et al. | |
| 2,732,301 | 1/1956 | Robertson et al. | |
| 2,744,103 | 5/1956 | Koch. | |
| 2,757,090 | 7/1956 | Meugebauer et al. | |
| 2,763,550 | 9/1956 | Lovick. | |
| 2,768,171 | 10/1956 | Clarke et al. | |
| 2,773,056 | 12/1956 | Helfaer. | |
| 2,798,000 | 7/1957 | Monterman. | |
| 2,809,189 | 10/1957 | Stanley et al. | |
| 2,827,358 | 3/1958 | Kaplan et al. | |
| 2,834,773 | 5/1958 | Scalera et al. | |
| 2,875,045 | 2/1959 | Lurie. | |
| 2,892,865 | 6/1959 | Giraldi et al. | |
| 2,897,187 | 7/1959 | Koch. | |
| 2,936,241 | 5/1960 | Sharp et al. | |
| 2,940,853 | 6/1960 | Sagura et al. | |
| 2,955,067 | 10/1960 | McBurney et al. | |
| 2,992,129 | 7/1961 | Gauthier. | |
| 2,992,198 | 7/1961 | Funahashi. | |
| 3,030,208 | 4/1962 | Schellenberg et al. | |
| 3,071,815 | 1/1963 | MacKinnon. | |
| 3,075,014 | 1/1963 | Palopoli et al. | |
| 3,076,813 | 2/1963 | Sharp. | |
| 3,104,973 | 9/1963 | Sprague et al. | |
| 3,114,634 | 12/1963 | Brown et al. | |
| 3,121,632 | 2/1964 | Sprague et al. | |
| 3,123,647 | 3/1964 | Duenneberger et al. | |
| 3,133,049 | 5/1964 | Hertel et al. | |
| 3,140,949 | 7/1964 | Sprague et al. | |
| 3,154,416 | 10/1964 | Fidelman. | |
| 3,155,509 | 11/1964 | Roscow. | |
| 3,175,905 | 3/1965 | Wiesbaden. | |
| 3,178,285 | 4/1965 | Anderau et al. | |
| 3,238,163 | 3/1966 | O'Neill. | |
| 3,242,215 | 3/1966 | Heitmiller. | |
| 3,248,337 | 4/1966 | Zirker et al. | |
| 3,266,973 | 8/1966 | Crowley. | |
| 3,282,886 | 11/1966 | Gadecki. | |
| 3,284,205 | 11/1966 | Sprague et al. | |
| 3,300,314 | 1/1967 | Rauner et al. | |
| 3,304,297 | 2/1967 | Wegmann et al. | |
| 3,305,361 | 2/1967 | Gaynor et al. | |
| 3,313,797 | 4/1967 | Kissa. | |
| 3,330,659 | 7/1967 | Wainer. | |
| 3,359,109 | 12/1967 | Harder et al. | |
| 3,361,827 | 1/1968 | Biletch. | |
| 3,363,969 | 1/1968 | Brooks. | |
| 3,385,700 | 5/1968 | Willems et al. | |
| 3,397,984 | 8/1968 | Williams et al. | |
| 3,415,875 | 12/1968 | Luethi et al. | |
| 3,418,118 | 12/1968 | Thommes et al. | |
| 3,445,234 | 5/1969 | Cescun et al. | 430/332 |
| 3,453,258 | 7/1969 | Parmerter et al. | |
| 3,453,259 | 7/1969 | Parmerter et al. | |
| 3,464,841 | 9/1969 | Skofronick. | |
| 3,479,185 | 11/1969 | Chambers. | |
| 3,502,476 | 3/1970 | Kohei et al. | |
| 3,503,744 | 3/1970 | Itano et al. | |
| 3,514,597 | 5/1970 | Haes et al. | |
| 3,541,142 | 11/1970 | Cragoe Jr. | |
| 3,547,646 | 12/1970 | Hori et al. | |
| 3,549,367 | 12/1970 | Chang et al. | |
| 3,553,710 | 1/1971 | Lloyd et al. | |
| 3,563,931 | 2/1971 | Horiguchi. | |
| 3,565,753 | 2/1971 | Yurkowitz. | |
| 3,574,624 | 4/1971 | Reynolds et al. | |
| 3,579,533 | 5/1971 | Yalman. | |
| 3,595,655 | 7/1971 | Robinson et al. | |
| 3,595,657 | 7/1971 | Robinson et al. | |
| 3,595,658 | 7/1971 | Gerlach et al. | |
| 3,595,659 | 7/1971 | Gerlach et al. | |
| 3,607,639 | 9/1971 | Krefeld et al. | |
| 3,607,693 | 9/1971 | Heine et al. | |
| 3,607,863 | 9/1971 | Dosch. | |
| 3,615,562 | 10/1971 | Harrison et al. | |
| 3,617,288 | 11/1971 | Hartman et al. | |
| 3,617,335 | 11/1971 | Kumura et al. | |
| 3,619,238 | 11/1971 | Kimura et al. | |
| 3,619,239 | 11/1971 | Osada et al. | |
| 3,637,337 | 1/1972 | Pilling. | |
| 3,637,581 | 1/1972 | Horioguchi et al. | |
| 3,642,472 | 2/1972 | Mayo. | |
| 3,647,467 | 3/1972 | Grubb. | |
| 3,652,275 | 3/1972 | Baum et al. | |
| 3,660,542 | 5/1972 | Adachi et al. | |
| 3,667,954 | 6/1972 | Itano et al. | |
| 3,668,188 | 6/1972 | King et al. | |
| 3,669,925 | 6/1972 | King et al. | |
| 3,671,096 | 6/1972 | Mackin. | |
| 3,671,251 | 6/1972 | Houle et al. | |
| 3,676,690 | 7/1972 | McMillin et al. | |
| 3,678,044 | 7/1972 | Adams. | |
| 3,689,565 | 9/1972 | Hoffmann et al. | |
| 3,694,241 | 9/1972 | Guthrie et al. | |
| 3,695,879 | 10/1972 | Laming et al. | |
| 3,697,280 | 10/1972 | Strilko. | |
| 3,705,043 | 12/1972 | Zablak. | |
| 3,707,371 | 12/1972 | Files. | |
| 3,729,313 | 4/1973 | Smith. | |
| 3,737,628 | 6/1973 | Azure. | |
| 3,765,896 | 10/1973 | Fox. | |
| 3,775,130 | 11/1973 | Enomoto et al. | |
| 3,788,849 | 1/1974 | Taguchi et al. | |
| 3,799,773 | 3/1974 | Watarai et al. | |
| 3,800,439 | 4/1974 | Sokolski et al. | |
| 3,801,329 | 4/1974 | Sandner et al. | |
| 3,817,752 | 6/1974 | Laridon et al. | |
| 3,840,338 | 10/1974 | Zviak et al. | |
| 3,844,790 | 10/1974 | Chang et al. | |
| 3,870,524 | 3/1975 | Watanabe et al. | |
| 3,873,500 | 3/1975 | Kato et al. | |
| 3,876,496 | 4/1975 | Lozano. | |
| 3,887,450 | 6/1975 | Gilano et al. | |
| 3,895,949 | 7/1975 | Akamatsu. | |
| 3,901,779 | 8/1975 | Mani. | |

| Patent No. | Date | Inventor |
|---|---|---|
| 3,910,993 | 10/1975 | Avar et al. |
| 3,914,165 | 10/1975 | Gaske |
| 3,914,166 | 10/1975 | Rudolph et al. |
| 3,915,824 | 10/1975 | McGinniss |
| 3,919,323 | 11/1975 | Houlihan et al. |
| 3,926,641 | 12/1975 | Rosen |
| 3,928,264 | 12/1975 | Young Jr. et al. |
| 3,933,682 | 1/1976 | Bean |
| 3,952,129 | 4/1976 | Matsukawa et al. |
| 3,960,685 | 6/1976 | Sano et al. |
| 3,965,157 | 6/1976 | Harrison |
| 3,978,132 | 8/1976 | Houlihan et al. |
| 3,984,248 | 10/1976 | Sturmer |
| 3,988,154 | 10/1976 | Sturmer |
| 4,004,998 | 1/1977 | Rosen |
| 4,012,256 | 3/1977 | Levinos |
| 4,017,652 | 4/1977 | Gruber |
| 4,022,674 | 5/1977 | Rosen |
| 4,024,324 | 5/1977 | Sparks |
| 4,039,332 | 8/1977 | Kokelenberg et al. |
| 4,043,819 | 8/1977 | Baumann |
| 4,048,034 | 9/1977 | Martan |
| 4,054,719 | 10/1977 | Cordes III |
| 4,056,665 | 11/1977 | Tayler et al. |
| 4,058,400 | 11/1977 | Crivello |
| 4,067,892 | 1/1978 | Thorne et al. |
| 4,071,424 | 1/1978 | Dart et al. |
| 4,073,968 | 2/1978 | Miyamoto et al. |
| 4,077,769 | 3/1978 | Johnston |
| 4,079,183 | 3/1978 | Green |
| 4,090,877 | 5/1978 | Streeper |
| 4,100,047 | 7/1978 | McCarty |
| 4,105,572 | 8/1978 | Gorondy |
| 4,107,733 | 8/1978 | Schickedanz |
| 4,110,112 | 8/1978 | Roman et al. |
| 4,111,699 | 9/1978 | Krueger |
| 4,114,028 | 9/1978 | Baio et al. |
| 4,126,412 | 11/1978 | Masson et al. |
| 4,141,807 | 2/1979 | Via |
| 4,144,156 | 3/1979 | Kuesters et al. |
| 4,148,658 | 4/1979 | Kondoh et al. |
| 4,162,162 | 7/1979 | Dueber |
| 4,171,977 | 10/1979 | Hasegawa et al. |
| 4,179,577 | 12/1979 | Green |
| 4,181,807 | 1/1980 | Green |
| 4,190,671 | 2/1980 | Vanstone et al. |
| 4,197,080 | 4/1980 | Mee ........ 430/211 |
| 4,199,420 | 4/1980 | Photis |
| 4,229,172 | 10/1980 | Baumann et al. |
| 4,232,106 | 11/1980 | Iwasaki et al. |
| 4,238,492 | 12/1980 | Majoie |
| 4,239,843 | 12/1980 | Hara et al. |
| 4,239,850 | 12/1980 | Kita et al. |
| 4,241,155 | 12/1980 | Hara et al. |
| 4,242,430 | 12/1980 | Hara et al. |
| 4,242,431 | 12/1980 | Hara et al. |
| 4,245,018 | 1/1981 | Hara et al. |
| 4,245,995 | 1/1981 | Hugl et al. |
| 4,246,330 | 1/1981 | Hara et al. |
| 4,248,949 | 2/1981 | Hara et al. |
| 4,250,096 | 2/1981 | Kvita et al. |
| 4,251,622 | 2/1981 | Kimoto et al. |
| 4,254,195 | 3/1981 | Hara et al. |
| 4,256,493 | 3/1981 | Yokoyama et al. |
| 4,256,817 | 3/1981 | Hara et al. |
| 4,258,123 | 3/1981 | Nagashima et al. |
| 4,258,367 | 3/1981 | Mansukhani |
| 4,259,432 | 3/1981 | Kondoh et al. |
| 4,262,936 | 4/1981 | Miyamoto |
| 4,268,605 | 5/1981 | Hara et al. |
| 4,268,667 | 5/1981 | Anderson |
| 4,269,926 | 5/1981 | Hara et al. |
| 4,270,130 | 5/1981 | Houle et al. |
| 4,271,252 | 6/1981 | Hara et al. |
| 4,271,253 | 6/1981 | Hara et al. |
| 4,272,244 | 6/1981 | Schlick |
| 4,276,211 | 6/1981 | Singer et al. |
| 4,277,497 | 7/1981 | Fromantin |
| 4,279,653 | 7/1981 | Makishima et al. |
| 4,279,982 | 7/1981 | Iwasaki et al. |
| 4,279,985 | 7/1981 | Nonogaki et al. |
| 4,284,485 | 8/1981 | Berner |
| 4,288,631 | 9/1981 | Ching |
| 4,289,844 | 9/1981 | Specht et al. |
| 4,290,870 | 9/1981 | Kondoh et al. |
| 4,293,458 | 10/1981 | Gruenberger et al. |
| 4,298,679 | 11/1981 | Shinozaki et al. |
| 4,300,123 | 11/1981 | McMillin et al. |
| 4,301,223 | 11/1981 | Nakamura et al. |
| 4,302,606 | 11/1981 | Barabas et al. |
| 4,306,014 | 12/1981 | Kunikane et al. |
| 4,307,182 | 12/1981 | Dalzell et al. |
| 4,308,400 | 12/1981 | Felder et al. |
| 4,315,807 | 2/1982 | Felder et al. |
| 4,318,705 | 3/1982 | Nowak et al. |
| 4,318,791 | 3/1982 | Felder et al. |
| 4,321,118 | 3/1982 | Felder et al. |
| 4,335,054 | 6/1982 | Blaser et al. |
| 4,335,055 | 6/1982 | Blaser et al. |
| 4,336,323 | 6/1982 | Winslow |
| 4,343,891 | 8/1982 | Aasen et al. |
| 4,345,011 | 8/1982 | Drexhage |
| 4,347,111 | 8/1982 | Gehlhaus et al. |
| 4,349,617 | 9/1982 | Kawwashiri et al. |
| 4,350,753 | 9/1982 | Shelnut et al. |
| 4,351,893 | 9/1982 | Anderson |
| 4,356,255 | 10/1982 | Tachikawa et al. |
| 4,357,468 | 11/1982 | Szejtli et al. |
| 4,359,524 | 11/1982 | Masuda et al. |
| 4,362,806 | 12/1982 | Whitmore |
| 4,367,072 | 1/1983 | Vogtle et al. |
| 4,367,280 | 1/1983 | Kondo et al. |
| 4,369,283 | 1/1983 | Altschuler |
| 4,370,401 | 1/1983 | Winslow et al. |
| 4,372,582 | 2/1983 | Geisler |
| 4,373,017 | 2/1983 | Masukawa et al. ........ 430/338 |
| 4,373,020 | 2/1983 | Winslow |
| 4,374,984 | 2/1983 | Eichler et al. |
| 4,376,887 | 3/1983 | Greenaway et al. |
| 4,383,835 | 5/1983 | Preuss et al. |
| 4,390,616 | 6/1983 | Sato et al. |
| 4,391,867 | 7/1983 | Derick et al. |
| 4,399,209 | 8/1983 | Sanders et al. |
| 4,400,173 | 8/1983 | Beavan |
| 4,401,470 | 8/1983 | Bridger |
| 4,416,961 | 11/1983 | Drexhage |
| 4,421,559 | 12/1983 | Owatari |
| 4,424,325 | 1/1984 | Tsunoda et al. |
| 4,425,162 | 1/1984 | Sugiyama |
| 4,425,424 | 1/1984 | Altland et al. ........ 430/332 |
| 4,426,153 | 1/1984 | Libby et al. |
| 4,434,035 | 2/1984 | Eichler et al. |
| 4,447,521 | 5/1984 | Tiers et al. |
| 4,450,227 | 5/1984 | Holmes et al. |
| 4,460,676 | 7/1984 | Fabel |
| 4,467,112 | 8/1984 | Matsuura et al. |
| 4,475,999 | 10/1984 | Via |
| 4,477,681 | 10/1984 | Gehlhaus et al. |
| 4,489,334 | 12/1984 | Owatari |
| 4,495,041 | 1/1985 | Goldstein |
| 4,496,447 | 1/1985 | Eichler et al. |
| 4,500,355 | 2/1985 | Shimada et al. |
| 4,508,570 | 4/1985 | Fugii et al. |
| 4,510,392 | 4/1985 | Litt et al. |

| | | | | | | |
|---|---|---|---|---|---|---|
| 4,523,924 | 6/1985 | Lacroix . | | 4,834,771 | 5/1989 | Yamauchi et al. . |
| 4,524,122 | 6/1985 | Weber et al. . | | 4,837,106 | 6/1989 | Ishikawa et al. . |
| 4,534,838 | 8/1985 | Lin et al. . | | 4,837,331 | 6/1989 | Yamanishi et al. . |
| 4,548,896 | 10/1985 | Sabongi et al. . | | 4,838,938 | 6/1989 | Tomida et al. . |
| 4,555,474 | 11/1985 | Kawamura . | | 4,839,269 | 6/1989 | Okazaki et al. . |
| 4,557,730 | 12/1985 | Bennett et al. . | | 4,849,320 | 7/1989 | Irving et al. . |
| 4,565,769 | 1/1986 | Dueber et al. . | | 4,853,037 | 8/1989 | Johnson et al. . |
| 4,567,171 | 1/1986 | Mangum . | | 4,853,398 | 8/1989 | Carr et al. . |
| 4,571,377 | 2/1986 | McGinniss et al. . | | 4,854,971 | 8/1989 | Gane et al. . |
| 4,595,745 | 6/1986 | Nakano et al. . | | 4,857,438 | 8/1989 | Loerzer et al. .......................... 430/332 |
| 4,604,344 | 8/1986 | Irving et al. . | | 4,861,916 | 8/1989 | Kohler et al. . |
| 4,605,442 | 8/1986 | Kawashita et al. . | | 4,865,942 | 9/1989 | Gottschalk et al. . |
| 4,613,334 | 9/1986 | Thomas et al. . | | 4,874,391 | 10/1989 | Reinert . |
| 4,614,723 | 9/1986 | Schmidt et al. . | | 4,874,899 | 10/1989 | Hoelderich et al. . |
| 4,617,380 | 10/1986 | Hinson et al. . | | 4,885,395 | 12/1989 | Hoelderich . |
| 4,620,875 | 11/1986 | Shimada et al. . | | 4,886,774 | 12/1989 | Doi . |
| 4,620,876 | 11/1986 | Fugii et al. . | | 4,892,941 | 1/1990 | Dolphin et al. . |
| 4,622,286 | 11/1986 | Sheets . | | 4,895,880 | 1/1990 | Gottschalk . |
| 4,631,085 | 12/1986 | Kawanishi et al. . | | 4,900,581 | 2/1990 | Stuke et al. . |
| 4,632,891 | 12/1986 | Banks et al. . | | 4,902,299 | 2/1990 | Anton . |
| 4,632,895 | 12/1986 | Patel et al. . | | 4,902,725 | 2/1990 | Moore . |
| 4,634,644 | 1/1987 | Irving et al. . | | 4,902,787 | 2/1990 | Freeman . |
| 4,638,340 | 1/1987 | Iiyama et al. . | | 4,911,732 | 3/1990 | Neumann et al. . |
| 4,647,310 | 3/1987 | Shimada et al. . | | 4,911,899 | 3/1990 | Hagiwara et al. . |
| 4,655,783 | 4/1987 | Reinert et al. . | | 4,917,956 | 4/1990 | Rohrbach . |
| 4,663,275 | 5/1987 | West et al. . | | 4,921,317 | 5/1990 | Suzuki et al. . |
| 4,663,641 | 5/1987 | Iiyama et al. . | | 4,925,770 | 5/1990 | Ichiura et al. . |
| 4,668,533 | 5/1987 | Miller . | | 4,925,777 | 5/1990 | Inoue et al. . |
| 4,672,041 | 6/1987 | Jain . | | 4,926,190 | 5/1990 | Lavar . |
| 4,698,291 | 10/1987 | Koibuchi et al. . | | 4,933,265 | 6/1990 | Inoue et al. . |
| 4,701,402 | 10/1987 | Patel et al. . | | 4,933,948 | 6/1990 | Herkstroeter . |
| 4,702,996 | 10/1987 | Griffing et al. . | | 4,937,161 | 6/1990 | Kita et al. . |
| 4,704,133 | 11/1987 | Reinert et al. . | | 4,942,113 | 7/1990 | Trundle . |
| 4,707,161 | 11/1987 | Thomas et al. . | | 4,950,304 | 8/1990 | Reinert et al. . |
| 4,707,425 | 11/1987 | Sasagawa et al. . | | 4,952,478 | 8/1990 | Miyagawa et al. . |
| 4,707,430 | 11/1987 | Ozawa et al. . | | 4,952,680 | 8/1990 | Schmeidl . |
| 4,711,668 | 12/1987 | Shimada et al. . | | 4,954,380 | 9/1990 | Kanome et al. . |
| 4,713,113 | 12/1987 | Shimada et al. . | | 4,956,254 | 9/1990 | Washizu et al. . |
| 4,720,450 | 1/1988 | Ellis . | | 4,964,871 | 10/1990 | Reinert et al. . |
| 4,721,531 | 1/1988 | Wildeman et al. . | | 4,965,294 | 10/1990 | Ohngemach et al. . |
| 4,721,734 | 1/1988 | Gehlhaus et al. . | | 4,966,607 | 10/1990 | Shinoki et al. . |
| 4,724,021 | 2/1988 | Martin et al. . | | 4,966,833 | 10/1990 | Inoue . |
| 4,724,201 | 2/1988 | Okazaki et al. . | | 4,968,596 | 11/1990 | Inoue et al. . |
| 4,725,527 | 2/1988 | Robillard . | | 4,968,813 | 11/1990 | Rule et al. . |
| 4,727,824 | 3/1988 | Ducharme et al. . | | 4,985,345 | 1/1991 | Hayakawa et al. . |
| 4,732,615 | 3/1988 | Kawashita et al. . | | 4,987,056 | 1/1991 | Imahashi et al. . |
| 4,737,190 | 4/1988 | Shimada et al. . | | 4,988,561 | 1/1991 | Wason . |
| 4,737,438 | 4/1988 | Ito et al. . | | 4,997,745 | 3/1991 | Kawamura et al. . |
| 4,740,451 | 4/1988 | Kohara . | | 5,001,330 | 3/1991 | Koch . |
| 4,745,042 | 5/1988 | Sasago et al. . | | 5,002,853 | 3/1991 | Aoai et al. . |
| 4,746,735 | 5/1988 | Kruper, Jr. et al. . | | 5,002,993 | 3/1991 | West et al. . |
| 4,752,341 | 6/1988 | Rock . | | 5,003,142 | 3/1991 | Fuller . |
| 4,755,450 | 7/1988 | Sanders et al. . | | 5,006,758 | 4/1991 | Gellert et al. . |
| 4,761,181 | 8/1988 | Suzuki . | | 5,013,959 | 5/1991 | Kogelschatz . |
| 4,766,050 | 8/1988 | Jerry . | | 5,017,195 | 5/1991 | Satou et al. . |
| 4,766,055 | 8/1988 | Kawabata et al. . | | 5,023,129 | 6/1991 | Morganti et al. . |
| 4,770,667 | 9/1988 | Evans et al. . | | 5,025,036 | 6/1991 | Carson et al. . |
| 4,771,802 | 9/1988 | Tannenbaum . | | 5,026,425 | 6/1991 | Hindagolla et al. . |
| 4,772,291 | 9/1988 | Shibanai et al. . | | 5,026,427 | 6/1991 | Mitchell et al. . |
| 4,772,541 | 9/1988 | Gottschalk . | | 5,028,262 | 7/1991 | Barlow, Jr. et al. . |
| 4,775,386 | 10/1988 | Reinert et al. . | | 5,028,792 | 7/1991 | Mullis . |
| 4,786,586 | 11/1988 | Lee et al. . | | 5,030,243 | 7/1991 | Reinert . |
| 4,789,382 | 12/1988 | Neumann et al. . | | 5,030,248 | 7/1991 | Meszaros . |
| 4,790,565 | 12/1988 | Steed . | | 5,034,526 | 7/1991 | Bonham et al. . |
| 4,800,149 | 1/1989 | Gottschalk . | | 5,037,726 | 8/1991 | Kojima et al. . |
| 4,803,008 | 2/1989 | Ciolino et al. . | | 5,045,435 | 9/1991 | Adams et al. . |
| 4,808,189 | 2/1989 | Oishi et al. . | | 5,045,573 | 9/1991 | Kohler et al. . |
| 4,812,139 | 3/1989 | Brodmann . | | 5,047,556 | 9/1991 | Kohler et al. . |
| 4,812,517 | 3/1989 | West . | | 5,049,777 | 9/1991 | Mechtersheimer . |
| 4,813,970 | 3/1989 | Kirjanov et al. . | | 5,053,320 | 10/1991 | Robbillard . |
| 4,822,714 | 4/1989 | Sanders . | | 5,055,579 | 10/1991 | Pawlowski et al. . |
| 4,831,068 | 5/1989 | Reinert et al. . | | 5,057,562 | 10/1991 | Reinert . |

| | | | | | | |
|---|---|---|---|---|---|---|
| 5,069,681 | 12/1991 | Bouwknegt et al. | | 5,241,059 | 8/1993 | Yoshinaga . |
| 5,070,001 | 12/1991 | Stahlhofen . | | 5,250,109 | 10/1993 | Chan et al. |
| 5,073,448 | 12/1991 | Vieira et al. | | 5,254,429 | 10/1993 | Gracia et al. |
| 5,074,885 | 12/1991 | Reinert . | | 5,256,193 | 10/1993 | Winnik et al. |
| 5,076,808 | 12/1991 | Hahn et al. | | 5,258,274 | 11/1993 | Helland et al. |
| 5,085,698 | 2/1992 | Ma et al. | | 5,261,953 | 11/1993 | Vieira et al. |
| 5,087,550 | 2/1992 | Blum et al. | | 5,262,276 | 11/1993 | Kawamura . |
| 5,089,050 | 2/1992 | Vieira et al. | | 5,268,027 | 12/1993 | Chan et al. |
| 5,089,374 | 2/1992 | Saeva . | | 5,270,078 | 12/1993 | Walker et al. |
| 5,096,456 | 3/1992 | Reinert et al. | | 5,271,764 | 12/1993 | Winnik et al. |
| 5,096,489 | 3/1992 | Laver . | | 5,271,765 | 12/1993 | Ma . |
| 5,096,781 | 3/1992 | Vieira et al. | | 5,272,201 | 12/1993 | Ma et al. |
| 5,098,477 | 3/1992 | Vieira et al. | | 5,275,646 | 1/1994 | Marshall et al. |
| 5,098,793 | 3/1992 | Rohrbach et al. | | 5,279,652 | 1/1994 | Kaufmann et al. |
| 5,098,806 | 3/1992 | Robillard . | | 5,282,894 | 2/1994 | Albert et al. |
| 5,106,723 | 4/1992 | West et al. | | 5,284,734 | 2/1994 | Blum et al. |
| 5,108,505 | 4/1992 | Moffat . | | 5,286,286 | 2/1994 | Winnik et al. |
| 5,108,874 | 4/1992 | Griffing et al. | | 5,286,288 | 2/1994 | Tobias et al. |
| 5,110,706 | 5/1992 | Yumoto et al. | | 5,294,528 | 3/1994 | Furutachi . |
| 5,110,709 | 5/1992 | Aoai et al. | | 5,296,275 | 3/1994 | Goman et al. |
| 5,114,832 | 5/1992 | Zertani et al. | | 5,296,556 | 3/1994 | Frihart . |
| 5,124,723 | 6/1992 | Laver . | | 5,298,030 | 3/1994 | Burdeska et al. |
| 5,130,227 | 7/1992 | Wade et al. | | 5,300,403 | 4/1994 | Angelopolus et al. |
| 5,133,803 | 7/1992 | Moffatt . | | 5,300,654 | 4/1994 | Nakajima et al. |
| 5,135,940 | 8/1992 | Belander et al. | | 5,302,195 | 4/1994 | Helbrecht . |
| 5,139,572 | 8/1992 | Kawashima . | | 5,302,197 | 4/1994 | Wickramanayke et al. |
| 5,139,687 | 8/1992 | Borgher Sr. et al. | | 5,310,778 | 5/1994 | Shor et al. |
| 5,141,556 | 8/1992 | Matrick . | | 5,312,713 | 5/1994 | Yokoyama et al. |
| 5,141,797 | 8/1992 | Wheeler . | | 5,312,721 | 5/1994 | Gesign . |
| 5,144,964 | 9/1992 | Demain . | | 5,324,349 | 6/1994 | Sano et al. |
| 5,147,901 | 9/1992 | Rutsch et al. | | 5,328,504 | 7/1994 | Ohnishi . |
| 5,153,104 | 10/1992 | Rossman et al. | | 5,330,860 | 7/1994 | Grot et al. |
| 5,153,105 | 10/1992 | Sher et al. | | 5,334,455 | 8/1994 | Noren et al. |
| 5,153,166 | 10/1992 | Jain et al. | | 5,338,319 | 8/1994 | Kaschig et al. |
| 5,160,346 | 11/1992 | Fuso et al. | | 5,340,631 | 8/1994 | Matsuzawa et al. |
| 5,160,372 | 11/1992 | Matrick . | | 5,340,854 | 8/1994 | Martic et al. |
| 5,166,041 | 11/1992 | Murofushi et al. | | 5,344,483 | 9/1994 | Hinton . |
| 5,169,436 | 12/1992 | Matrick . | | 5,356,464 | 10/1994 | Hickman et al. |
| 5,169,438 | 12/1992 | Matrick . | | 5,362,592 | 11/1994 | Murofushi et al. |
| 5,173,112 | 12/1992 | Matrick et al. | | 5,368,689 | 11/1994 | Agnemo . |
| 5,176,984 | 1/1993 | Hipps Sr. et al. | | 5,372,387 | 12/1994 | Wajda . |
| 5,178,420 | 1/1993 | Shelby . | | 5,372,917 | 12/1994 | Tsuchida et al. |
| 5,180,425 | 1/1993 | Matrick et al. | | 5,374,335 | 12/1994 | Lindgren et al. |
| 5,180,652 | 1/1993 | Yamaguchi et al. | | 5,376,503 | 12/1994 | Audett et al. |
| 5,181,935 | 1/1993 | Reinert et al. | | 5,383,961 | 1/1995 | Bauer et al. |
| 5,185,236 | 2/1993 | Shiba et al. | | 5,384,186 | 1/1995 | Trinh . |
| 5,187,045 | 2/1993 | Bonham et al. | | 5,393,580 | 2/1995 | Ma et al. |
| 5,187,049 | 2/1993 | Sher et al. | | 5,401,303 | 3/1995 | Stoffel et al. |
| 5,190,565 | 3/1993 | Berenbaum et al. | | 5,401,562 | 3/1995 | Akao . |
| 5,190,710 | 3/1993 | Kletecka . | | 5,415,686 | 5/1995 | Kurabayashi et al. |
| 5,190,845 | 3/1993 | Hashimoto et al. | | 5,415,976 | 5/1995 | Ali . |
| 5,193,854 | 3/1993 | Borowski Jr. et al. | | 5,424,407 | 6/1995 | Tanaka et al. |
| 5,196,295 | 3/1993 | Davis . | | 5,425,978 | 6/1995 | Berneth et al. |
| 5,197,991 | 3/1993 | Rembold . | | 5,426,164 | 6/1995 | Babb et al. |
| 5,198,330 | 3/1993 | Martic et al. | | 5,427,415 | 6/1995 | Chang . |
| 5,202,209 | 4/1993 | Winnik et al. | | 5,429,628 | 7/1995 | Trinh et al. |
| 5,202,210 | 4/1993 | Matsuoka et al. | | 5,431,720 | 7/1995 | Nagai et al. |
| 5,202,211 | 4/1993 | Vercoulen . | | 5,432,274 | 7/1995 | Luong et al. |
| 5,202,212 | 4/1993 | Shin et al. | | 5,445,651 | 8/1995 | Thoen et al. |
| 5,202,213 | 4/1993 | Nakahara et al. | | 5,445,842 | 8/1995 | Tanaka et al. |
| 5,202,215 | 4/1993 | Kanakura et al. | | 5,455,143 | 10/1995 | Zaki . |
| 5,202,221 | 4/1993 | Imai et al. | | 5,459,014 | 10/1995 | Nishijima et al. |
| 5,205,861 | 4/1993 | Matrick . | | 5,464,472 | 11/1995 | Horn et al. |
| 5,208,136 | 5/1993 | Zanoni et al. | | 5,466,283 | 11/1995 | Kondo et al. |
| 5,209,814 | 5/1993 | Felten et al. | | 5,474,691 | 12/1995 | Severns . |
| 5,219,703 | 6/1993 | Bugner et al. | | 5,475,080 | 12/1995 | Gruber et al. |
| 5,221,334 | 6/1993 | Ma et al. | | 5,476,540 | 12/1995 | Shields et al. |
| 5,224,197 | 6/1993 | Zanoni et al. | | 5,479,949 | 1/1996 | Battard et al. |
| 5,224,476 | 7/1993 | Schultz et al. | | 5,489,503 | 2/1996 | Toan . |
| 5,224,987 | 7/1993 | Matrick . | | 5,498,345 | 3/1996 | Jollenbeck et al. |
| 5,226,957 | 7/1993 | Wickramanayake et al. | | 5,501,774 | 3/1996 | Burke . |
| 5,227,022 | 7/1993 | Leonhardt et al. | | 5,503,664 | 4/1996 | Sano et al. |

| | | | | | | |
|---|---|---|---|---|---|---|
| 5,509,957 | 4/1996 | Tolan et al. . | | 60192729 | 10/1985 | Japan . |
| 5,532,112 | 7/1996 | Kohler et al. . | | 60239739 | 11/1985 | Japan . |
| | FOREIGN PATENT DOCUMENTS | | | 60239740 | 11/1985 | Japan . |
| | | | | 60239741 | 11/1985 | Japan . |
| 94118 | 5/1958 | Czech Rep. . | | 60239743 | 11/1985 | Japan . |
| 0003884 | 9/1979 | European Pat. Off. . | | 61-14995 | 1/1986 | Japan . |
| 0127574 | 12/1984 | European Pat. Off. . | | 6114994 | 1/1986 | Japan . |
| 0223587 | 5/1987 | European Pat. Off. . | | 6121184 | 1/1986 | Japan . |
| 0262533 | 4/1988 | European Pat. Off. . | | 61288 | 1/1986 | Japan . |
| 0280458 | 8/1988 | European Pat. Off. . | | 613781 | 1/1986 | Japan . |
| 0308274 | 3/1989 | European Pat. Off. . | | 6125885 | 2/1986 | Japan . |
| 0371304 | 6/1990 | European Pat. Off. . | | 6130592 | 2/1986 | Japan . |
| 0373662 | 6/1990 | European Pat. Off. . | | 6140366 | 2/1986 | Japan . |
| 0375160 | 6/1990 | European Pat. Off. . | | 61-128973 | 6/1986 | Japan . |
| 0390439 | 10/1990 | European Pat. Off. . | | 61-97025 | 9/1986 | Japan . |
| 0458140A1 | 10/1991 | European Pat. Off. . | | 61-222789 | 10/1986 | Japan . |
| 0458140 | 11/1991 | European Pat. Off. . | | 61247703 | 11/1986 | Japan . |
| 0468465 | 1/1992 | European Pat. Off. . | | 61285403 | 12/1986 | Japan . |
| 0542286 | 5/1993 | European Pat. Off. . | | 627703 | 1/1987 | Japan . |
| 000571190 | 11/1993 | European Pat. Off. . | | 62-100557 | 5/1987 | Japan . |
| 2245010 | 4/1975 | France . | | 6297881 | 5/1987 | Japan . |
| 2383157 | 10/1978 | France . | | 62127281 | 6/1987 | Japan . |
| 1047787 | 12/1957 | German Dem. Rep. . | | 63-43959 | 2/1988 | Japan . |
| 1022801 | 1/1958 | German Dem. Rep. . | | 63-48370 | 3/1988 | Japan . |
| 1039835 | 9/1958 | German Dem. Rep. . | | 6395439 | 4/1988 | Japan . |
| 1040562 | 10/1958 | German Dem. Rep. . | | 6395440 | 4/1988 | Japan . |
| 1045414 | 12/1958 | German Dem. Rep. . | | 6395445 | 4/1988 | Japan . |
| 1047013 | 12/1958 | German Dem. Rep. . | | 6395447 | 4/1988 | Japan . |
| 1132450 | 7/1962 | German Dem. Rep. . | | 6395448 | 4/1988 | Japan . |
| 1132540 | 7/1962 | German Dem. Rep. . | | 6395449 | 4/1988 | Japan . |
| 1154069 | 9/1963 | German Dem. Rep. . | | 6395450 | 4/1988 | Japan . |
| 1240811 | 5/1967 | German Dem. Rep. . | | 63151946 | 6/1988 | Japan . |
| 2202497 | 8/1972 | German Dem. Rep. . | | 63-164953 | 7/1988 | Japan . |
| 2432563 | 2/1975 | German Dem. Rep. . | | 63-165498 | 7/1988 | Japan . |
| 2437380 | 2/1975 | German Dem. Rep. . | | 63-223077 | 9/1988 | Japan . |
| 2444520 | 3/1975 | German Dem. Rep. . | | 63-223078 | 9/1988 | Japan . |
| 2416259 | 10/1975 | German Dem. Rep. . | | 63243101 | 10/1988 | Japan . |
| 2714978 | 10/1977 | German Dem. Rep. . | | 63-199781 | 12/1988 | Japan . |
| 2722264 | 11/1978 | German Dem. Rep. . | | 64-15049 | 1/1989 | Japan . |
| 158237 | 1/1983 | German Dem. Rep. . | | 6429337 | 1/1989 | Japan . |
| 3126433 | 1/1983 | German Dem. Rep. . | | 64-40948 | 2/1989 | Japan . |
| 3415033 | 10/1984 | German Dem. Rep. . | | 89014948 | 3/1989 | Japan . |
| 3921600 | 1/1990 | German Dem. Rep. . | | 1128063 | 5/1989 | Japan . |
| 3833437 | 4/1990 | German Dem. Rep. . | | 1146974 | 6/1989 | Japan . |
| 3833438 | 4/1990 | German Dem. Rep. . | | 01210477 | 8/1989 | Japan . |
| 004036328 | 7/1991 | Germany . | | 1288854 | 11/1989 | Japan . |
| 4132288 | 4/1992 | Germany . | | 2058573 | 2/1990 | Japan ............................ 552/114 |
| 4126461 | 2/1993 | Germany . | | 292957 | 4/1990 | Japan . |
| 662500 | 4/1964 | Italy . | | 2179642 | 7/1990 | Japan . |
| 424756 | 2/1967 | Japan . | | 2282261 | 11/1990 | Japan . |
| 4315663 | 7/1968 | Japan . | | 3-134072 | 6/1991 | Japan . |
| 4726653 | 7/1972 | Japan . | | 03163566 | 7/1991 | Japan . |
| 4745409 | 11/1972 | Japan . | | 3-170415 | 7/1991 | Japan . |
| 49-8909 | 2/1974 | Japan . | | 3-206439 | 9/1991 | Japan . |
| 5065592 | 6/1975 | Japan . | | 5134447 | 11/1991 | Japan . |
| 51-17802 | 2/1976 | Japan . | | 3-203694 | 12/1991 | Japan . |
| 53-104321 | 9/1978 | Japan . | | 3284668 | 12/1991 | Japan . |
| 55-62059 | 5/1980 | Japan . | | 4023884 | 1/1992 | Japan . |
| 55-90506 | 7/1980 | Japan . | | 4023885 | 1/1992 | Japan . |
| 0014233 | 2/1981 | Japan . | | 4-45174 | 2/1992 | Japan . |
| 5614569 | 2/1981 | Japan . | | 4100801 | 4/1992 | Japan . |
| 56-24472 | 3/1981 | Japan . | | 4-136075 | 5/1992 | Japan . |
| 56-36556 | 4/1981 | Japan . | | 04356087 | 12/1992 | Japan . |
| 5761055 | 4/1982 | Japan . | | 543806 | 2/1993 | Japan . |
| 57128283 | 8/1982 | Japan . | | 561220 | 3/1993 | Japan . |
| 57171775 | 10/1982 | Japan . | | 5080506 | 4/1993 | Japan . |
| 58-124452 | 7/1983 | Japan . | | 05119506 | 5/1993 | Japan . |
| 58-125770 | 7/1983 | Japan . | | 5-140498 | 6/1993 | Japan . |
| 58-222164 | 12/1983 | Japan . | | 2-219869 | 9/1993 | Japan . |
| 5989360 | 5/1984 | Japan . | | 5263067 | 10/1993 | Japan . |
| 29219270 | 12/1984 | Japan . | | 680915 | 3/1994 | Japan . |
| 59-219270 | 4/1985 | Japan . | | 6116555 | 4/1994 | Japan . |

| | | |
|---|---|---|
| 6116556 | 4/1994 | Japan . |
| 6116557 | 4/1994 | Japan . |
| 6-175584 | 6/1994 | Japan . |
| 6214339 | 8/1994 | Japan . |
| 6256494 | 9/1994 | Japan . |
| 6256633 | 9/1994 | Japan . |
| 6395446 | 4/1998 | Japan . |
| 7113828 | 4/1972 | Netherlands . |
| 603767 | 8/1978 | Switzerland . |
| 197808 | 5/1988 | Switzerland . |
| 1310767 | 5/1987 | U.S.S.R. . |
| 1772118 | 10/1992 | U.S.S.R. . |
| 275245 | 10/1928 | United Kingdom . |
| 349339 | 5/1931 | United Kingdom . |
| 355686 | 8/1931 | United Kingdom . |
| 399753 | 10/1933 | United Kingdom . |
| 441085 | 1/1936 | United Kingdom . |
| 463515 | 4/1937 | United Kingdom . |
| 492711 | 9/1938 | United Kingdom . |
| 518612 | 3/1940 | United Kingdom . |
| 539912 | 9/1941 | United Kingdom . |
| 626727 | 7/1947 | United Kingdom . |
| 600451 | 4/1948 | United Kingdom . |
| 616362 | 1/1949 | United Kingdom . |
| 618616 | 2/1949 | United Kingdom . |
| 779389 | 7/1957 | United Kingdom . |
| 1372884 | 11/1974 | United Kingdom . |
| 2146357 | 4/1985 | United Kingdom . |
| 92/11295 | 7/1992 | WIPO . |
| 93/06597 | 4/1993 | WIPO . |
| 94/01503 | 1/1994 | WIPO . |
| 94/22500 | 10/1994 | WIPO . |
| 94/22501 | 10/1994 | WIPO . |
| 95/04955 | 2/1995 | WIPO . |
| 96/00740 | 1/1996 | WIPO . |
| 96/19502 | 6/1996 | WIPO . |
| 96/22335 | 7/1996 | WIPO . |

OTHER PUBLICATIONS

U.S. Patent application Ser. No. 08/403,240, filed Mar. 10, 1995.

U.S. Patent application Ser. No. 08/444,670, filed May 19, 1995.

U.S. Patent application Ser. No. 08/444,780, filed May 19, 1995.

U.S. Patent application Ser. No. 08/453,912, filed May 30, 1995.

U.S. Patent application Ser. No. 08/456,784, filed Jun. 1, 1995.

U.S. Patent application Ser. No. 08/457,025, filed Jun. 1, 1995.

U.S. Patent application Ser. No. 08/461,365, filed Jun. 5, 1995.

U.S. Patent application Ser. No. 08/461,372, filed Jun. 5, 1995.

U.S. Patent application Ser. No. 08/461,373, filed Jun. 5, 1995.

U.S. Patent application Ser. No. 08/461,382, filed Jun. 5, 1995.

U.S. Patent application Ser. No. 08/461,445, filed Jun. 5, 1995.

U.S. Patent application Ser. No. 08/461,656, filed Jun. 5, 1995.

U.S. Patent application Ser. No. 08/461,991, filed Jun. 5, 1995.

U.S. Patent application Ser. No. 08/462,101, filed Jun. 5, 1995.

U.S. Patent application Ser. No. 08/462,103, filed Jun. 5, 1995.

U.S. Patent application Ser. No. 08/462,105, filed Jun. 5, 1995.

U.S. Patent application Ser. No. 08/462,107, filed Jun. 5, 1995.

U.S. Patent application Ser. No. 08/462,214, filed Jun. 5, 1995.

U.S. Patent application Ser. No. 08/462,217, filed Jun. 5, 1995.

U.S. Patent application Ser. No. 08/463,103, filed Jun. 5, 1995.

U.S. Patent application Ser. No. 08/463,185, filed Jun. 5, 1995.

U.S. Patent application Ser. No. 08/463,187, filed Jun. 5, 1995.

U.S. Patent application Ser. No. 08/463,188, filed Jun. 5, 1995.

U.S. Patent application Ser. No. 08/463,189, filed Jun. 5, 1995.

U.S. Patent application Ser. No. 08/463,496, filed Jun. 5, 1995.

U.S. Patent application Ser. No. 08/464,216, filed Jun. 5, 1995.

U.S. Patent application Ser. No. 08/465,376, filed Jun. 5, 1995.

U.S. Patent application Ser. No. 08/465,377, filed Jun. 5, 1995.

U.S. Patent application Ser. No. 08/465,393, filed Jun. 5, 1995.

U.S. Patent application Ser. No. 08/465,397, filed Jun. 5, 1995.

U.S. Patent application Ser. No. 08/465,655, filed Jun. 5, 1995.

U.S. Provisional application Ser. No. 60/000,570, filed Jun. 28, 1995.

U.S. Patent application Ser. No. 08/537,593, filed Oct. 2, 1995.

U.S. Patent application Ser. No. 08/563,381, filed Nov. 28, 1995.

U.S. Patent application Ser. No. 08/589,321, filed Jan. 22, 1996.

U.S. Patent application Ser. No. 08/589,449, filed Jan. 22, 1996.

U.S. Patent application Ser. No. 08/625,737, filed Mar. 29, 1996.

U.S. Patent application Ser. No. 08/627,693, filed Mar. 29, 1996.

U.S. Patent application Ser. No. 08/649,754, filed May 29, 1996.

U.S. Patent application Ser. No. 08/649,755, filed May 29, 1996.

U.S. Patent application Ser. No. 08/659,497, filed Jun. 5, 1996.

U.S. Patent application Ser. No. 08/733,086, filed Oct. 16, 1996.

Kubat et al. "Photophysical properties of metal complexes of meso–tetrakis (40sulphonatophenyl) porphyrin." *J. Photochem. and Photobiol.* 96 93–97 1996.

Abstract for WO 95/00343 –A1 *Textiles: Paper: Cellulose* p. 7 1995.

Maki, Y. et al. "A novel heterocyclic N–oxide, pyrimido[5,4–g]pteridinetetrone 5–oxide, with multifunctional photooxidative properties" *Chemical Abstracts* 122 925 [no 122:31350 F] 1995.

Abstract of patent, JP 6–80915 (Canon Inc.), Mar. 22, 1994.
Abstract of patent, JP 0643573 1994.
Pitchumani, K. et al. "Modification of chemical reactivity upon cyclodextrin encapsulation" *Chemical Abstracts* 121 982 [no. 121:13362 4v] 1994.
Derwent Publications Ltd., London, JP 05297627 (Fujitsu Ltd.), Nov. 12, 1993. (Abstract).
Patent Abstracts of Japan, JP 5241369 (Bando Chem Ind Ltd et al.), Sep. 21, 1993. (Abstract).
Derwent Publications Ltd., London, JP 05232738 (Yamazaki, T.), Sep. 10, 1993. (Abstract).
Derwent Publications Ltd., London, EP 000559310 (Zeneca Ltd.), Sep. 8, 1993. (Abstract).
Derwent Publications Ltd., London, J.A. 5–230410 (Seiko Epson Corp), Sep. 7, 1993. (Abstract).
Derwent Publications Ltd., London, JP 5–230407 (Mitsubishi Kasei Corp), Sep. 7, 1993. (Abstract).
Abstract of Patent, JP 405230410 (Seiko Epson Corp.), Sep. 7, 1993. (Abstract).
Abstract of Patent, JP 405230407 (Mitsubishi Kasei Corp.), Sep. 7, 1993. (Abstract).
Patent Abstracts of Japan, JP 5197198 (Bando Chem Ind Ltd et al.), Aug. 6, 1993. (Abstract).
Database WPI –Derwent Publications Ltd., London, J.A. 5197069 (Bando Chem), Aug. 6, 1993. (Abstract).
Abstract of patent, JP 5–195450 (Nitto Boseki Co. Ltd), Aug. 3, 1993.
Patent Abstracts of Japan, JP5181308 (Bando Chem Ind Ltd et al.), Jul. 23, 1993. (Abstract).
Patent Abstracts of Japan, JP 5181310 (Bando Chem Ind Ltd et al.), Jul. 23, 1993. (Abstract).
Derwent Publications Ltd., London, JP 5–132638 (Mitsubishi Kasei Corp), May 28, 1993. Abstract.
Abstract of Patent, JP 405132638 (Mitsubishi Kasei Corp.), May 28, 1993. (Abstract).
Derwent Publications Ltd., London, JP 5–125318 (Mitsubishi Kasei Corp), May 12, 1993. (Abstract).
Abstract of Patent, JP 405125318 (Mitsubishi Kasei Corp.), May 21, 1993. (Abstract).
Abstract of patent, JP 05–117200 1993.
Derwent Publications Ltd., London, JP 05061246 (Ricoh KK), Mar. 12, 1993. (Abstract).
Husain, N. et al., "Cyclodextrins as mobile–phase additives in reversed–phase HPLC" *American Laboratory* 82 80–87 1993.
Hamilton, D.P. "Tired of Shredding? New Ricoh Method Tries Different Tack" *Wall Street Journal* B2 1993.
"Cyclodextrins: A Breakthrough for Molecular Encapsulation" *American Maize Products Co. (AMAIZO)* 1993.
Duxbury "The Photochemistry and Photophysics of Triphenylmethane Dyes in Solid Liquid Media" *Chemical Review* 93 381–433 1993.
Abstract of patent, JP 04–351603 1992.
Abstract of patent, JP 04–351602 1992.
Derwent Publications Ltd., London, JP 404314769 (Citizen Watch Co. Ltd.), Nov. 5, 1992. (ABSTRACT).
Abstract of patent, JP 04315739 1992.
Derwent Publications Ltd., London, JP 04300395 (Funai Denki KK), Oct. 23, 1992. (Abstract).
Derwent Publications Ltd., London, JP 404213374 (Mitsubishi Kasei Corp), Aug. 4, 1992. (Abstract).
Abstract of patent, JP 04–210228 1992.
Abstract Of Patent, JP 404202571 (Canon Inc.), Jul. 23, 1992. (Abstract).

Abstract Of Patent, JP 404202271 (Mitsubishi Kasei Corp.), Jul. 23, 1992. (Abstract).
Derwent Publications Ltd., London, JP 4–189877 (Seiko Epson Corp), Jul. 8, 1992. (Abstract).
Derwent Publications Ltd., London, JP 404189876 (Seiko Epson Corp), Jul. 8, 1992. (Abstract).
Abstract Of Patent, JP 404189877 (Seiko Epson Corp.), Jul. 8, 1992. (Abstract).
Derwent Publications Ltd., London, J.A. 4–170479 (Seiko Epson Corp), Jun. 18, 1992. (Abstract).
Abstract of patent, JP 04–81402 1992.
Abstract of patent, JP 04–81401 1992.
Kogelschatz "Silent–discharge driven excimer UV sources and their applications" *Applied Surface Science* 410–423 1992.
Derwent Publications, Ltd., London, JP 403269167 (Japan Wool Textile KK), Nov. 29, 1991 (Abstract).
Derwent Publications Ltd., London, JO 3247676 (Canon KK), Nov. 5, 1991 (Abstract).
Abstract of patent, JP 03–220384 1991.
Derwent Publications Ltd., London, JP 3167270 (Mitsubishi Kasei Corp), Jul. 19, 1991.(Abstract).
Derwent Publications Ltd., London, JO 3167270 (Mitsubishi Kasei Corp.), Jul. 19, 1991 (Abstract).
Derwent Publications Ltd., London, JO 3093870 (Dainippon Ink Chem KK), Apr. 18, 1991 (Abstract).
Abstract of patent, JP 06369890 1991.
Kogelschat, U. et al. "New Excimer UV Sources for Industrial Applications" *ABB Review* 1–10 1991.
Abstract of patent, JP 03 41165 1991.
"Coloring/Decoloring Agent for Tonor Use Developed" *Japan Chemical Week* 1991.
Braithwaite, M., et al. "Formulation" *Chemistry & Technololgy of UV & EB Formulation for Coatings, Inks & Paints* IV 11–12 1991.
*Scientific Polymer Products, Inc. Brochure* 24–31 1991.
Dietliker, K. "Photoiniators for Free Radical and Catioinc Polymerisation" *Chem & Tech of UV & EB Formulation for Coatings, Inks & Paints* III 280 1991.
Dietliker, K. "Photoiniators for Free Radical and Catioinc Polymerisation" *Chem & Tech of UV & EB Formulation for Coatings, Inks & Paints* III 61, 63, 229–232, 405, 414, 1991.
Esrom et al., "Large area Photochemical Dry Etching of Polymers iwth Incoherent Excimer UV Radiation" *MRS Materials Research Society* 1–7 1991.
"New Excimer UV Sources for Industrial Applications" *ABB Review* 391 1–10 1991.
Esrom et al., Excimer Laser–Induced Decompostion of Aluminum Nitride *Materials Research Society Fall Meeting* 1–6 1991.
Esrom et al., "Metal deposition with a windowless VUV excimer source" *Applied Surface Science* 1–5 1991.
Esrom "Excimer Laser–Induced Surface Activation of Aln for Electroless Metal Deposition" *Mat. Res. Sco.lSymp. Proc.* 204 457–465 1991.
Zhang et al., "UV–induced decompositin of adsorbed Cu–acetylacetonate films at room temperature for electroless metal plating" *Applied Surface Science* 1–6 1991.
"German company develops reuseable paper" *Pulp & Paper* 1991.
Abstract of patent, JP 02289652 1990.
Ohashi et al., "Molecular Mechanics Studies on Inclusion Compounds of Cyanine Dye Monomers and Dimers in Cyclodextrin Cavities," *J. Am. Chem. Soc.* 112 5824–5830 1990.

Kogelschatz et al., "New Incoherent Ultraviolet Excimer Sources for Photolytic Material Deposition," *Laser Und Optoelektronik* 1990.

Abstract of Patent, JP 0297957, (Fuji Xerox Co., Ltd.) 1990.

Derwent Publications Ltd., London, JP 2091166 (Canon KK), Mar. 30, 1990. (Abstract).

Esrom et al. "Metal Deposition with Incoherent Excimer Radiation" *Mat. Res. Soc. Symp. Proc.* 158 189–198 1990.

Esrom "UV Excimer Laer–Induced Deposition of Palladium from palladiym Acetate Films" *Mat. Res. Soc. Symp. Proc.* 158 109–117 1990.

Kogelschatz, U. "Silent Discharges for the Generation of ultraviolet and vacuum ultraviolet excimer radiation" *Pure & Applied Chem.* 62 1667–74 1990.

Esrom et al. "Investigation of the mechanism of the UV–induced palladium depostions processf from thin solid palladium acetate films" *Applied Surface Science* 46 158–162 1990.

Zhang et al. "VUV synchrotron radiation processing of thin palladium acetate spin–on films for metallic surface patterning" *Applied Surface Science* 46 153–157 1990.

Brennan et al., "Tereoelectronic effects in ring closure reactions: the 2'–hydroxychalcone –flavanone equilibrium, and related systems," *Canadian J. Chem.* 68 (10) pp. 1780–1785 1990.

Abstract of patent, JP 01299083 1989.

Derwent Publications Ltd., London, J.O. 1182379 (Canon KK), Jul. 20, 1989. (Abstract).

Derwent Publications Ltd., London, JO 1011171 (Mitsubishi Chem Ind. KK.), Jan. 13, 1989 (Abstract).

Gruber, R.J., et al. "Xerographic Materials" *Encyclopedia of Polymer Science and Engineering* 17 918–943 1989.

Pappas, S.P. "Photocrosslinking" *Comph. Pol. Sci.* 6 135–148 1989.

Pappas, S.P. "Photoinitiated Polymerization" *Comph. Pol. Sci.* 4 337–355 1989.

Kirilenko, G.V. et al., "An analog of the vesicular process with amplitude modulation of the incident light beam" *Chemical Abstracts* 111 569 [no. 111:12363 3b] 1989.

Esrom et al., "UV excimer laser–induced pre–nucleation of surfaces followed by electroless metallization" *Chemtronics* 4 216–223 1989.

Esrom et al., "VUV light–induced depostion of palladium using an incoherent Xe2* excimer source" *Chemtronics* 4 1989.

Esrom et al., "UV Light–Induced Depostion of Copper Films" C5–719–C5–725 1989.

Falbe et al., *Rompp Chemie Lexikon* 9 270 1989.

Derwent Publications, Ltd., London, SU 1423656 (Kherson Ind Inst), Sep. 15, 1988 (Abstract).

Derwent Publications, Ltd., London, EP 0280653 (Ciba GeigyAG), Aug. 31, 1988 (Abstract).

Abstract of patent, JP 63190815 1988.

Furcone, S.Y. et al., "Spin–on B14Sr3Ca3Cu4O16+x superconducting thin films from citrate precursors," *Appl. Phys. Lett.*52(2 5 2180–2182 5) 1988.

Abstract of patent, JP 63144329 1988.

Abstract of patent, JP 63130164 1988.

Derwent Publications, Ltd., London, J6 3112770 (Toray Ind Inc), May 17, 1988 (Abstract).

Derwent Publications, Ltd., London, J6 3108074 (Konishiroku Photo KK), May 12, 1988 (Abstract).

Derwent Publications, Ltd., London,J6 3108073 (Konishiroku Photo KK), May 12, 1988 (Abstract).

Abstract of patent, JP 6177846 1988.

Abstract of patent, JP 6373241 1988.

Abstract of patent, JP 6347762, 1988.

Abstract of patent, JP 63 47763, 1988.

Abstract of patent, JP 63–47764, 1988.

Abstract of patent, JP 63–47765, 1988.

Eliasson, B., et al., "UV Excimer Radiation from Dielectric–Barrier Discharges" *Applied Physics B* 46 299–303 1988.

Eliasson et al., "New Trends in High Intensity UV Generation" *EPA Newsletter* (32) 29–40 1988.

Cotton, F.A. "Oxygen: Group Via (16)" *Advanced Inorganic Chemistry* 5th ed. 473–474 1988.

Derwent Publications, Ltd., London, J6 2270665 (Konishiroku Photo KK), Nov. 25, 1987 (Abstract).

Abstract of patent, JP 62215261 1987.

Database WPI, Derwent Publications Ltd., London, JP 62032082 (Mitsubishi Denki KK), Feb. 12, 1987. (Abstract).

Abstract of patent, JP 6232082 1987.

Derwent Publications Ltd., London, J6 2007772 (Alps Electric KK.), Jan. 14, 1987 (Abstract).

Gross et al., "Laser direct–write metallization in thin palladium acetate films" *J. App. Phys.* 61 (4) 1628–1632 1987.

Al–Ismail et al., "Some experimental results on thin polypropylene films loaded with finely–disperesed copper" *Journal of Materials Science* 415–418 1987.

Baufay et al., "Optical self–regulation during laser–induced oxidation of copper" *J. Appl. Phys.* 61 (9) 4640–4651 1987.

Derwent Publications Ltd., London, JA 0284478 (Sanyo Chem Ind Ltd.), Dec. 15, 1986. (Abstract).

Abstract of patent, JP 61251842 1986.

Database WPI, Derwent Publications Ltd., London, GB; SU, A, 1098210 (Kutulya L A) Jun. 23, 1986.

Abstract of patent, JP 61–97025 1986.

Abstract of patent, JP 61–87760 1986.

Derwent Publications Ltd., London, DL 0234731 (Karl Marx Univ. Leipzig), Apr. 9, 1986 (Abstract).

Derwent Publications, Ltd., London, J6 1041381 (Osaka Prefecture), Feb. 27, 1986 (Abstract).

Sakai et al. "A Novel and Practical Synthetic Method of 3(2H)–Furanone Derivatives," *J. Heterocyclie Chem.* 23 pp. 1199–1201 1986.

Jellinek, H.H.G. et al., "Evolution of H2O and CO2 During the Copper–Catalyzed Oxidation of Isotactic Polypropylene," *J. Polymer Sci.* 24 389–403 1986.

Jellinek, H.H.G. et al., "Diffusion of Ca2+ Catalysts from Cu–Metal Polymer or Cu–Oxide/Polymer Interfaces into Isotactic Polypropylene," *J. Polymer Sci.* 24 503–510 1986.

Derwent Publications Ltd., London, J6 0226575 (Sumitomo Chem Ind Ltd.), Oct. 11, 1985 (Abstract).

Abstract of patent, JP 60156761 1985.

Derwent Publications Ltd., London, J.A. 0011451 (Fugi Photo Film KK), Jan. 21, 1985 (Abstract).

Derwent Publications, Ltd., London J6 0011–449–A (Taoka Chemical KK) Jan. 21, 1985 (abstract).

Roos, G. et al., "Textile applications of photocrosslinkable polymers" *Chemical Abstracts* 103 57 [No. 103:23690j] 1985.

Derwent Publications Ltd., London, JP 0198187 (Canon KK), Nov. 9, 1984. (Abstract).

Derwent Publicaions Ltd., London, J.A, 0169883 (Ricoh KK), Sep. 25, 1984. (Abstract).

Derwent Publications Ltd., London, JA 0198187 (Canon KK), Sep. 11, 1984 (Abstract).

Derwent Publicaions Ltd., London, J.A. 0053563 (Dainippon Toryo KK), Mar. 28, 1984. (Abstract).

Derwent Publications Ltd., London, J.A. 0053562 (Dainippon Toryo KK), Mar. 28, 1984. (Abstract).

Abstract of Patent, JA 0053563 (Dainippon Toryo KK), Mar. 28, 1984 (Abstract).

Abstract of Patent, JA 0053562 (Dainippon Toryo KK), Mar. 28, 1984 (Abstract).

Derwent Publications Ltd., London, J.A. 0051961 (Dainippon Toryo KK), Mar. 26, 1984. (Abstract).

Saenger, W. "Structural Aspects of Cyclodextrins and Their Inclusion Complexes" *Inclusion Compounds–Structural Aspects of Inclusion Compounds formed by Organic Host* 2 231–259 1984.

Szejtli "Industrial Applications of Cyclodextrins" *Inclusion Compounds: Physical Prop. & Applns* 3 331–390 1984.

Kano et al. "Three–Component Complexes of Cyclodextrins. Exciplex Formation in Cyclodextrin Cavity," *J. Inclusion Phenomena* 2 pp. 737–746 1984.

Suzuki et al., "Spectroscopic Investigation of Cyclodextrin Monomers, Derivatives, Polymers and Azo Dyes," *J. Inclusion Phenomena* 2, pp. 715–724 1984.

Abstract of Patent, JA 0222164 (Ricoh KK), Dec. 23, 1983 (Abstract).

Abstract of patent, JP 58211426 (Sekisui Plastics KK), Dec. 8, 1983.

Derwent Publications, Ltd., London, EP 0072775 (Ciba Geigy AG), Feb. 23, 1983 (Abstract).

van Beek, H.C.A "Light–Induced Colour Changes in Dyes and Materials" *Color Res. and Appl.* 8 176–181 1983.

Connors, K.A. "Application of a stoichimetric model of cyclodextrin complex formation" *Chemical Abstracts* 98 598 [no. 98:53067g] 1983.

Abstract of Patent, EP 0065617 (IBM Corp.), Dec. 1, 1982 (Abstract).

Derwent Publications Ltd., London, J.A. 0187289 (Honshu Paper Mfg KK), Nov. 17, 1982. (Abstract).

Abstract of Patent, JA 0187289 (Honsho Paper Mfg KK), Nov. 17, 1982 (Abstract).

Abstract of Patent, JA 0185364 (Ricoh KK), Nov. 15, 1982 (Abstract).

Derwent Publications, Ltd., London J5 7139–146 (Showa Kako KK) Aug. 27, 1982 (abstract).

Abstract of Patent, JA 0090069 (Canon KK), Jun. 4, 1982 (Abstract).

Derwent Publications, Ltd., London, JA 0061785 (Nippon Senka KK), Apr. 14, 1982 (Abstract).

Fischer, "Submicroscopic contact imaging with visible light by energy transfer" *Appl. Phys. Letter* 40(3) 1982.

Abstract of patent, JA 0010659 (Canon KK), Jan. 2, 1982 (Abstract).

Abstract of Patent, JA 0010661 (Canon KK), Jan. 2, 1982 (Abstract).

Christen "Carbonylverbindungen: Aldehyde und Ketone," *Grundlagen der Organischen Chemie* 255 1982.

Derwent Publications Ltd., London, J.A. 0155263 (Canon KK), Dec. 1, 1981. (Abstract).

Abstract of Patent, JA 0155263 (Canon KK), Dec. 1, 1981. (Abstract).

Abstract of Patent, JA 0147861 (Canon KK), Nov. 17, 1981 (Abstract).

Derwent Publications Ltd., London, J.A. 0143273 (Canon KK), Nov. 7, 1981. (Abstract).

Abstract of Patent, JA 0143272 (Canon KK), Nov. 7, 1981 (Abstract).

Abstract of Patent, JA 0136861 (Canon KK), Oct. 26, 1981 (Abstract).

Abstract of Patent, JA 6133378 (Canon KK), Oct. 19, 1981 (Abstract).

Abstract of Patent, JA 6133377 (Canon KK), Oct. 19, 1981 (Abstract).

Abstract of Patent, JA 6093775 (Canon KK), Jul. 29, 1981 (Abstract).

Derwent Publications Ltd., London, J.A. 0008135 (Ricoh KK), Jan. 27, 1981. (Abstract).

Derwent Publications Ltd., London, J.A. 0004488 (Canon KK), Jan. 17, 1981. (Abstract).

Abstract of Patent, JA 0004488 (Canon KK), Jan. 17, 1981 (Abstract).

Kirk–Othmer "Metallic Coatings," *Encyclopedia of Chemical Technology* 15 241–274 1981.

Komiyama et al. "One–Pot Preparation of 4–Hydroxychalcone β–Cyclodextrin as Catalyst," *Makromol. Chem.* 2 733–734 1981.

Derwent Publications, Ltd., London CA 1086–719 (Sherwood Medical) Sep. 30, 1980 (abstract).

Rosanske et al. "Stoichiometric Model of Cyclodextrin Complex Formation" *Journal of Pharmaceutical Sciences* 69 (5) 564–567 1980.

Semple et al., "Synthesis of Functionalized Tetrahydrofurans," *Tetrahedron Letters* 81 pp. 4561–4564 1980.

Kirk–Orthmer "Film Deposition Techniques," *Encyclopedia of Chemical Technology* 10 247–283 1980.

Derwent World Patents Index, Derwent Info. Ltd., JP 54158941 (Toyo Pulp KK), Dec. 15, 1979. (Abstract).

Derwent Publications Ltd., London, J.A. 0005422 (Fuji Photo Film KK), Jan. 16, 1979. (Abstract).

Drexhage et al. "Photo–bleachable dyes and processes" *Research Disclosure* 85–87 1979.

"Color imaging devices and color filter arrays using photo–bleachable dyes" *Research Disclosure* 22–23 1979.

Wolff, N.E., et al. "Electrophotography" *Kirk–Othmer Encyclopedia of Chemical Technology* 8 794–826 1979.

Derwent Publications Ltd., London, J.A. 0012037 (Pentel KK), Jan. 29, 1977 (Abstract).

Abstract of Patent, JA 0012037(Pentel KK), Jan. 29, 1977 (Abstract).

Jenkins, P.W. et al. "Photobleachable dye material" *Research Disclosure* 18 [No. 12932] 1975.

Lamberts, R.L. "Recording color grid patterns with lenticules" *Research Disclosure* 18–19 [No. 12923] 1975.

Karmanova, L.S. "Light stabilizers of daytime fluorescent paints" *Chemical Abstracts* 82 147 [No. 59971p] 1975.

Prokopovich, B. et al., "Selection of effective photoinducers for rapid hardening of polyester varnish PE–250" *Chemical Abstracts* 83 131 [No. 81334a] 1975.

"Variable Contrast Printing System" *Research Disclosure* 19 [No. 12931] 1975.

Lakshman "Electronic Absorption Spectrum of Copper Formate Tetrahydrate" *Chemical Physics Letters* 31 (2) 331–334 1975.

Derwent Publications, Ltd., London J4 9131–226 (TNational Cash Register C) Dec. 16, 1974 (abstract).

Chang, I.F., et al., "Color Modulated Dye Ink Jet Printer" *IBM Technical Disclosure Bulletin* 17 (5) 1520–1521 1974.

"Darocur 1173: Liquid Photoiniator for Ultraviolet Curing of Coatings" 1974.

Hosokawa et al., "Ascofuranone, an antibiotic from Ascochyta," Japan Kokai 73 91,278 (Nov. 28, 1973) *MERCK Index* 80 p. 283; abstract 94259t 1974.

Abstract of patent, NL 7112489 (Dec. 27, 1971).

Gafney et al., "Photochemical Reactions of Copper (II) –1,3–Diketonate Complexes" *Journal of the Americqal Chemical Society* 1971.

Derwent Publications, Ltd., London SU 292698–S Jan. 15, 1971 (abstract).

Rigdon, J.E. "In Search of Paper that Spies Can't Copy" *Wall Street Journal*.

Chatterjee, S. et al., "Photochemistry of Carbocyanine Alkyltriphenylborate Salts: Intra–Ion–Pair Electron Transfer and the Chemistry of Boranyl Radicals" *J. Am. Chem. Soc.* 112 6329–6338.

"Assay –Physical and Chemical Analysis of Complexes" *AMAIZO*.

"Cyclodextrin" *AMAIZO*.

"Beta Cyclodextrin Polymer (BCDP)" *AMAIZO*.

"Chemically Modified Cyclodextrins" *AMAIZO*.

"Cyclodextrin Complexation" *American Maize Products Co.*

"Monomers" *Scientific Polymer Products Inc.*

Suppan, Paul "Quenching of Excited States" *Chemistry and Light* 65–69.

Yamaguchi, H. et al., "Supersensitization Aromatic ketones as supersensitizers" *Chemical Abstracts* 53 107 (d).

Stecher, H. "Ultraviolet–absorptive additives in adhesives, lacquers and plastics" *Chemical Abstracts* 53 14579 (c).

Maslenikov, A.S. "Coupling of diazonium salts with ketones" *Chemical Abstracts* 60 3128e.

Derwent Publications Ltd., London, 4 9128022.

Abstract of Patent, JP 405195450.

Rose, Philip I. "Gelatin." *Encyclopedia of Chemical Technology* 7 488–513.

5,786,132

PRE-DYES, MUTABLE DYE COMPOSITIONS, AND METHODS OF DEVELOPING A COLOR

CROSS-REFERENCE TO RELATED APPLICATIONS

This application is a continuation-in-part application of U.S. Ser. No. 08/463,187, filed on Jun. 5, 1995, now abandoned, which is hereby incorporated by reference.

TECHNICAL FIELD

The present invention relates to novel pre-dyes that are colorless and develop color when exposed to certain wavelengths of electromagnetic radiation. The present invention also relates to methods of changing conventional leuco dyes to form colored compositions when exposed to certain wavelengths of electromagnetic radiation.

BACKGROUND OF THE INVENTION

It is well known that dyes, in their reduced leuco form, can provide the basis of color image forming systems. The leuco dyes may initially be relatively colorless, but can return to a colored form when oxidized, e.g., by nitrate salts in the presence of heat. Examples of leuco dyes used in color image forming systems include triarylmethanes, xanthenes, styryl dyes, and azine dyes, such as, for example, phenazines, phenoxazines, and phenothiazines.

It is also known that the leuco form of a given dye may suffer from instability under ambient conditions and can often revert spontaneously to the colored form of the dye. This tendency is increased when photoxidizing agents, for example, trihalogenomethyl compounds which split off halogen radicals upon exposure, are added to obtain an intensification of contrast. A number of stabilizers, for example, sulfur compounds, phenols and other reducing agents have therefore been recommended for leuco dye compositions.

Thus, what is needed is a leuco dye that is stable in solution even in the presence of artificial light or sunlight. The ideal leuco dye would be converted to stable colored molecules by exposure to electromagnetic radiation that normally would not be present in ordinary light. In summary, it would be extremely desirable to obtain stable leuco derivatives of dyes that could be transformed to a stable colored molecule.

SUMMARY OF THE INVENTION

One embodiment of the present invention is a method and composition comprising a novel pre-dye molecule that is colorless and stable to ordinary light. The pre-dye molecule is capable of forming a color when exposed to certain wavelengths of electromagnetic radiation.

In particular, the novel pre-dye of the present invention is a dye that is covalently attached to a radiation transorber. The resulting pre-dye molecule is stable in ordinary light but is mutable when exposed to the appropriate wavelength of electromagnetic radiation. The radiation transorber is desirably composed of a wavelength-specific sensitizer and a photoreactor. When the pre-dye is exposed to the appropriate wavelength of electromagnetic radiation, the pre-dye molecule mutates and is transformed into the stable colored form of the dye. Accordingly, the present invention also encompasses a method of forming color by exposing the pre-dye to the appropriate wavelength of ultraviolet radiation.

Another embodiment of the present invention is a conventional leuco dye that is admixed with a radiation transorber, preferably with a molecular includant. When the admixture is exposed to the appropriate wavelength of electromagnetic radiation, the leuco dye is converted to its colored form.

Yet another embodiment of the present invention is a method of converting a conventional leuco dye to a colored composition by exposing the leuco dye admixed with a radiation transorber to certain wavelengths of electromagnetic radiation The present invention can be used in imaging processes including photoimaging processes, security systems, printing processes, recording processes and the like.

These and other objects, features and advantages of the present invention will become apparent after a review of the following detailed description of the disclosed embodiments and the appended claims.

DETAILED DESCRIPTION OF THE INVENTION

The present invention relates, in one aspect, to pre-dyes that are mutable by exposure to narrow band-width radiation to form colored compounds. The present invention more particularly relates to a composition, the pre-dye, comprising a dye molecule which is covalently attached to a radiation transorber. When the dye molecule is covalently attached to the radiation transorber, the composition is colorless. The pre-dye is mutable when exposed to specific, narrow band-width radiation and mutates to the stable colored form of the dye. Accordingly, the present invention also encompasses a method of forming color by exposing the pre-dye to the appropriate wavelength of ultraviolet radiation.

In another embodiment of the present invention, the composition of the present invention includes an admixture of a conventional leuco dye and a radiation transorber. The leuco dye, in the presence of the radiation transorber, is adapted, upon exposure of the transorber to radiation, preferably ultraviolet radiation, to be mutable to a colored composition. The preferred radiation transorber is adapted to absorb ultraviolet radiation and interact with the leuco dye to effect the irreversible mutation of the molecule to a colored composition.

Yet another embodiment of the present invention is a method of converting a conventional leuco dye to a colored composition by exposing the leuco dye admixed with a radiation transorber to certain wavelengths of electromagnetic radiation After definitions of various terms used herein, the pre-dye of the present invention and methods of developing color using the same are described in detail, followed by a description of the leuco dye/radiation transorber admixture and methods of developing color using the same.

Definitions

As used herein, the term "dye" is meant to include, without limitation, any material which typically will be an organic material, such as an organic colorant or pigment. Desirably, the dye will be substantially transparent to, that is, will not significantly interact with, the ultraviolet radiation to which it is exposed. The term is meant to include a single material or a mixture of two or more materials.

The term "pre-dye" or "pre-dye molecule" as used herein means a dye molecule that is covalently attached to a radiation transorber so that the composition is colorless. Upon irradiation with the appropriate wavelength of electromagnetic radiation, the composition is capable of forming a colored composition.

The term "leuco dye" refers to the leuco form of a dye, or colorless form, and is the reduced form of the dye having one or two hydrogen atoms, the removal of which, together with an additional electron in certain cases, produces the colored dye.

As used herein, the term "irreversible" means that the dye will not revert to its original color when it no longer is exposed to ultraviolet radiation.

The term "composition" and such variations as "colored composition" are used herein to mean a dye, and a radiation transorber. When reference is being made to a colored composition which is adapted for a specific application, the term "composition-based" is used as a modifier to indicate that the material includes a dye, a radiation transorber and, optionally, a molecular includant.

The term "molecular includant," as used herein, is intended to mean any substance having a chemical structure which defines at least one cavity. That is, the molecular includant is a cavity-containing structure. As used herein, the term "cavity" is meant to include any opening or space of a size sufficient to accept at least a portion of one or both of the dye and the radiation transorber. The molecular includant can also include a cavity-containing molecule to which the radiation transorber is optionally covalently attached. A description of the method of preparing molecular includants covalently attached to radiation transorbers, and their association with colorants, is described in Examples 6–24, and in patent application Ser. No. 08/461,372, filed Jun. 5, 1995, now abandoned, which is incorporated herein by reference.

The term "functionalized molecular includant" is used herein to mean a molecular includant to which one or more molecules of an ultraviolet radiation transorber are covalently coupled to each molecule of the molecular includant. The term "degree of substitution" is used herein to refer to the number of these molecules or leaving groups (defined below) which are covalently coupled to each molecule of the molecular includant.

The term "derivatized molecular includant" is used herein to mean a molecular includant having more than two leaving groups covalently coupled to each molecule of molecular includant. The term "leaving group" is used herein to mean any leaving group capable of participating in a bimolecular nucleophilic substitution reaction.

The term "ultraviolet radiation" is used herein to mean electromagnetic radiation having wavelengths in the range of from about 4 to about 400 nanometers. The especially desirable ultraviolet radiation range for the present invention is between approximately 100 to 375 nanometers. Thus, the term includes the regions commonly referred to as ultraviolet and vacuum ultraviolet. The wavelength ranges typically assigned to these two regions are from about 180 to about 400 nanometers and from about 100 to about 180 nanometers, respectively.

The term "mutable," with reference to the pre-dye or the leuco dye/radiation transorber mixture is used to mean that the absorption maximum of the dye is capable of being mutated or changed by exposure to radiation, preferably ultraviolet radiation, when in the presence of the radiation transorber so that the absorption maximum is shifted to the visible region. In general, it is only necessary that such absorption maximum be mutated to an absorption maximum which is different from that of the pre-dye prior to exposure to the ultraviolet radiation, and that the mutation be irreversible. In other words, the dye can mutate from colorless to a color.

The term "compound" is intended to include a single material or a mixture of two or more materials. If two or more materials are employed, it is not necessary that all of them absorb radiation of the same wavelength. As discussed more fully below, a radiation transorber is comprised of a photoreactor and a wavelength selective sensitizer.

The term "radiation transorber" is used herein to mean any material which is adapted to absorb radiation at a specific wavelength and interact with the dye to affect the mutation of the dye. In some embodiments, the radiation transorber may be an organic compound. A description of the synthesis of the radiation transorber is described in Examples 6–8, and 13, and in patent application Ser. No. 08/461,372, filed Jun. 5, 1995, now abandoned, which is incorporated herein by reference.

Pre-Dye Molecule

One embodiment of the present invention is a pre-dye molecule that is mutable by exposure to narrow band-width radiation to form a colored compounds. The present invention more particularly relates to a composition, the pre-dye molecule or "pre-dye", comprising a dye molecule which is covalently attached to a radiation transorber. When the dye molecule is covalently attached to the radiation transorber, the composition is colorless. The pre-dye is mutable when exposed to specific, narrow band-width radiation and mutates to the stable colored form of the dye.

The present invention includes unique compounds, namely, radiation transorbers, that are capable of absorbing narrow wavelength ultraviolet radiation. The compounds are synthesized by combining a wavelength-selective sensitizer and a photoreactor. Generally, photoreactors do not efficiently absorb high energy radiation. However, when a photoreactor is combined with a wavelength-selective sensitizer, the resulting compound is a wavelength specific compound that efficiently absorbs a very narrow spectrum of radiation. In this compound the wavelength-specific sensitizer generally absorbs radiation having a specific wavelength, and therefore a specific amount of energy, and transfers the energy to the photoreactor. Desirably, the wavelength-selective sensitizer is covalently coupled to the photoreactor.

Accordingly, the radiation transorber that is attached to the dye molecule is capable of absorbing radiation and interacting with the dye molecule to effect a mutation of the pre-dye to form a colored compound. The radiation transorber may be any material which is adapted to absorb radiation and interact with the dye to effect the mutation of the dye. It is desirable that the mutation of the pre-dye be irreversible. In the desired embodiment, the radiation transorber is covalently attached to the dye molecule thereby rendering the dye molecule colorless.

By way of example, the wavelength-selective sensitizer may be, but is not limited to, phthaloylglycine or 4-(4-hydroxy-phenyl)-2-butanone. These wavelength-specific sensitizers are illustrated below:

Phthaloylglycine

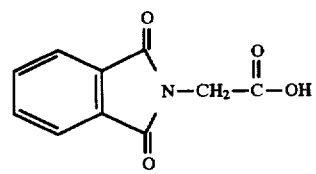

4-(4-Hydroxy phenyl) butan-2-one

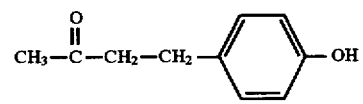

The photoreactor may be, but is not limited to, 1-(4-(2-hydroxyethoxy) phenyl)-2-hydroxy-2-methylpropan-1-one (DAROCUR®-2959) or 1-hydroxycyclohexane phenyl ketone (IRGACURE®184). These reactive species-generating photoinitiators are illustrated below:

DAROCUR ®2959

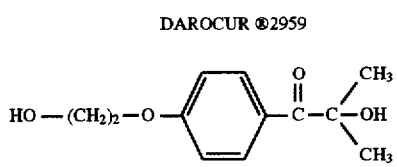

IRGACURE® 184 (1-hydroxycyclohexane phenyl ketone)

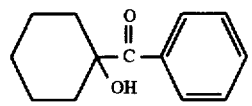

It is to be understood that the above named sensitizers and photoreactors are named in their unbonded form. For example, where the photoreactor 1-hydroxycyclohexane phenyl ketone is covalently bonded to a sensitizer via its hydroxy group, the photoreactor moiety may be denoted as cyclohexyl-phenyl ketone ester. Where the sensitizer 4-(4-hydroxyphenyl)-2-butanone is covalently bonded to a photoreactor via its hydroxy group, the sensitizer moiety may be denoted as 4-(4-oxyphenyl)-2-butanone. Similarly, where the sensitizer phthaloylglycine is covalently bonded to a photoreactor via its hydroxy group, the sensitizer moiety may be denoted as phthaloylglycyl. When the sensitizer is covalently bonded to the photoreactor, these sensitizers and photoreactors may be referred to in their unbonded form for simplicity.

By way of example, the radiation transorber may be 2-(p-(2-methyllactoyl)phenoxy)ethyl 1,3-dioxo-2-isoindoline-acetate having the formula

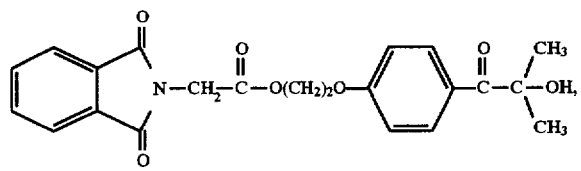

phthaloylglycyl-cyclohexylphenyl ketone ester having the formula

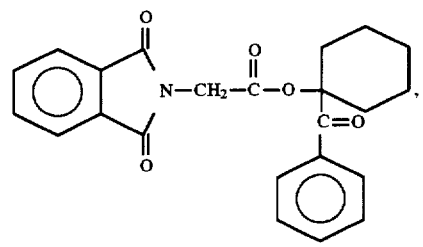

4-(4-oxyphenyl)-2-butanone-1-(4-(2-oxyethoxy)phenyl)-2-hydroxy-2-methyl-propan-1-one (or 2-hydroxy-2-methyl-4'-(2-(p-(3-oxobutyl) phenoxy)ethoxy)-propiophenone) having the formula

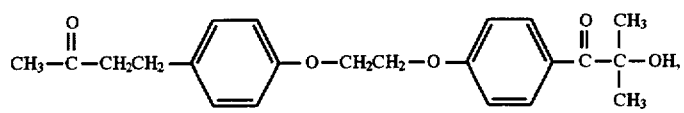

or 4-(4-oxyphenyl)-2-butanonecyclohexyl-phenyl ketone (or 4-(p-((4-benzoylcyclohexyl) oxy)phenyl)-2-butanone) having the formula

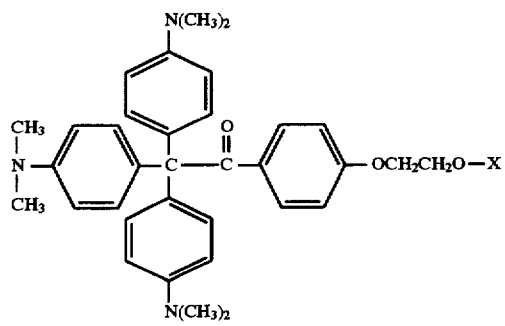

Examples 6–8, and 13 describe methods of preparing the above radiation transorbers. It is to be understood that other sensitizers, photoreactors, and radiation transorbers than those specifically listed above may be used in the present invention.

Accordingly, the following formula represents a pre-dye wherein the dye molecule is a leuco form of crystal violet (N-(4-(Bis(4-(dimethylamino)phenyl)methylen-2,5-cyclohexa-dien-1-ylidene)-N-methylmethanaminium chloride) covalently bonded to X, wherein X represents a radiation transorber, or wherein X represents a wavelength-specific sensitizer covalently bonded thereto, wherein the oxyethoxyphenyl group functions as a photoreactor.

By way of example, the pre-dye may be, but is not limited to, the following formulas:

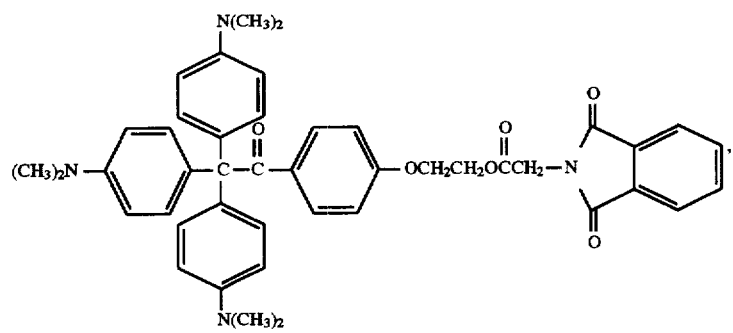
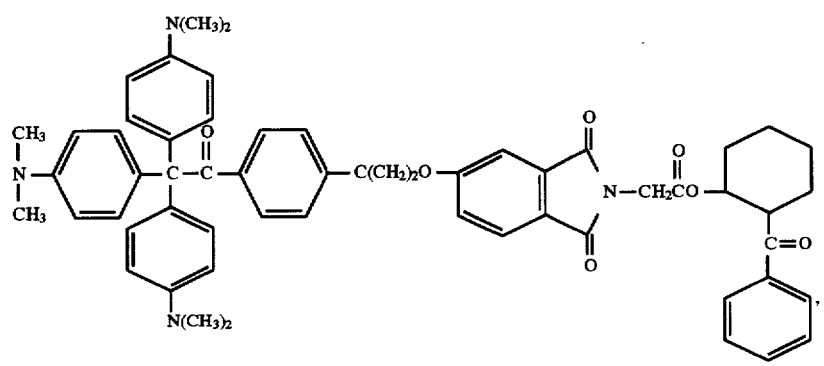
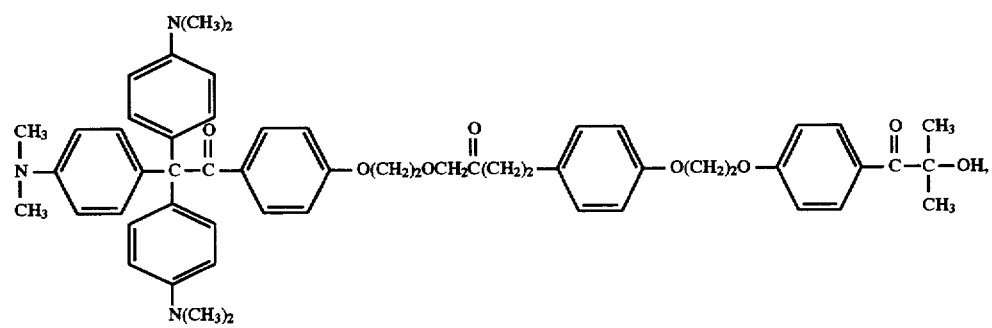
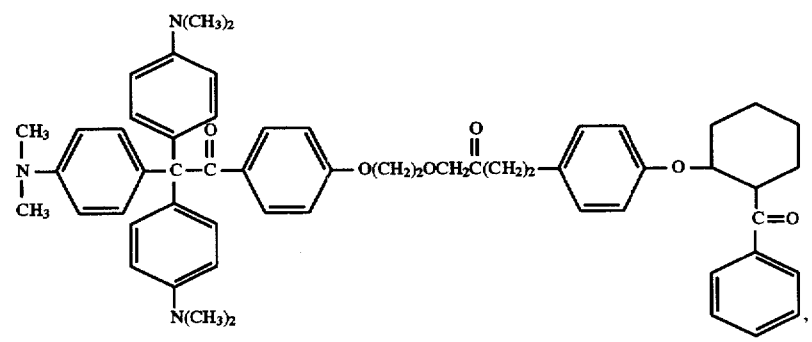
or

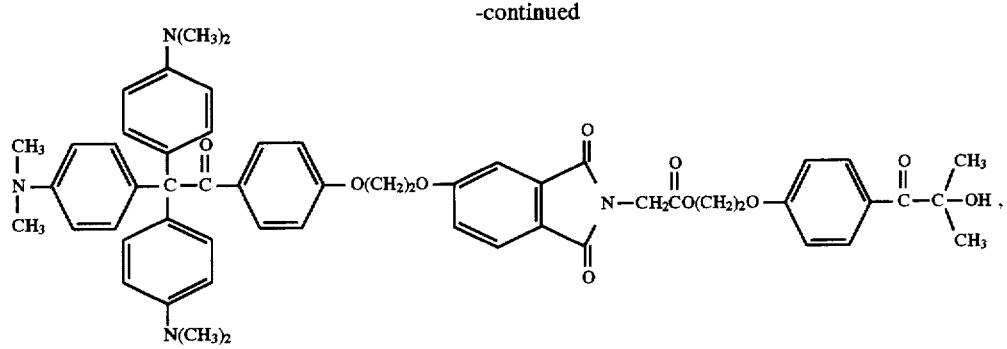

A desired pre-dye has the following formula:

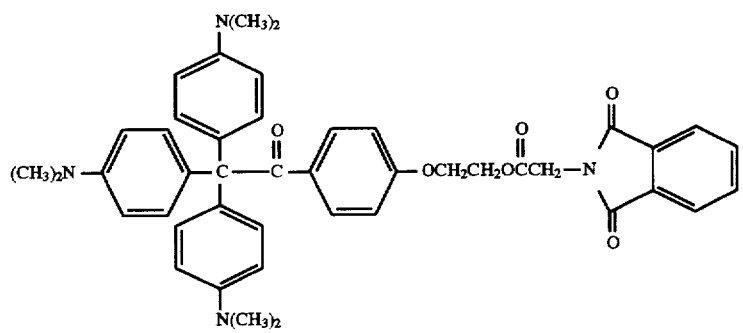

This particular structure shows the radiation transorber, 2-(p-(2-methyllactoyl) phenoxy)ethyl 1,3-dioxo-2-isoindolineacetate, attached to crystal violet (N-(4-(Bis(4-(dimethylamino)-phenyl) methylen-2,5-cyclohexedien-1-ylidene)-N-methyl-methanaminium chloride). Examples 1–3 describe how to prepare the above pre-dye molecule.

It is to be understood that the disclosed formulas are merely an example of the pre-dye concept that is considered part of the present invention and that other dyes can be substituted for the crystal violet and other radiation transorbers can be employed in substitution of the above radiation transorbers.

For example, the following are other pre-dyes of the present invention, wherein X represents a radiation transorber, and wherein R represents a hydrogen, methyl, or ethyl group.

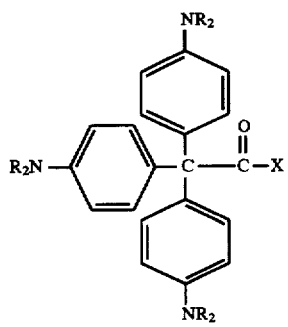

-continued

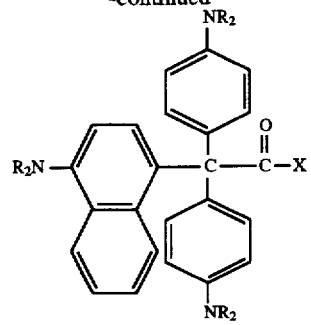

The present invention also relates to a method of forming a colored composition. The method comprises irradiating a composition containing a pre-dye. The pre-dye is a molecule comprising a dye molecule covalently attached to a radiation transorber. When the dye molecule is covalently attached to the radiation transorber, the composition is colorless. The method comprises exposing the pre-dye to ultraviolet radiation at a dosage level sufficient to mutate the dye. Example 4 further illustrates the method of forming a colored composition utilizing the pre-dye of the present invention.

The pre-dye of the present invention can be irradiated with radiation having a wavelength of between about 4 to about 1,000 nanometers depending upon the radiation transorber that is present in the composition. Thus, the radiation may be ultraviolet radiation, including near ultraviolet and far or vacuum ultraviolet radiation; visible radiation; and near infrared radiation. Desirably, the pre-dye is irradiated with radiation having a wavelength of from about 4 to about 700 nanometers. More d esirably, the pre-dye is irradiated with ultraviolet radiation having a wavelength of from about 4 to about 400 nanometers. It is more desirable that the radiation have a wavelength of between about 100 and 375 nanometers.

The present invention also relates to a substrate having an image thereon that is formed by the pre-dye molecule of the present invention.

Leuco Dye/Radiation Transorber Admixture

In another embodiment of the present invention, the compositio n of the present invention includes an admixture of a conventional leuco dye and a radiation transorber. The leuco dye, in the presence of the radiation transorber, is adapted, upon exposure of the transorber to radiation, preferably ultraviolet radiation, to be mutable to a colored composition. The preferred radiation transorber is adapted to absorb ultraviolet radiation and interact with the leuco dye to effect the irreversible mutation of the molecule to a colored composition.

The radiation transorbers that may be a dmixed w ith a leuco dye in the present invention are described above.

Leuco dyes that can be used in the present invention include, but are not limited to, aminotriarylmethanes, aminoxanthenes, aminothioxanthenes, amino-9,10-dihydroacrirdines, aminophenoxazines, aminophenothiazines, aminodihydrophenazines, aminodiphenylmethanes, leuco indamines, aminohydrocinnamic acids (cyanoethanes, leucomethines), hydrazines, leuco indigoid dyes, amino-2,3-dihydroanthraquinones, phenethylanilines, 10-acyl-aminodihydrophenazines, 10-acyl-aminophenothiazines, 10-acyl-aminophenoxazines and aminotriarylmethanes wherein the methane hydroge n has been replaced by an alkylthio, benzylthio, 2-phenylhydrazino, or alkoxycarbonyl group. The generally preferred class of leuco dyes is the aminotriarylmethane class and derivatives thereof. The aminotriarylmethane dyes, as well as the other classes of dyes, are reviewed in Abrahart, E. N., Dyes and their Intermediates, Chemical Publishing Co., Inc., (1977) which is incorporated herein by reference. The aminotriarylmethanes are reviewed at page 151 of the Abrahart reference. A desirable leuco dye is an aminotriarylmethane dye.

The present invention also includes forming a colored molecule from a leuco dye by admixing the leuco dye with a radiation transorber, and irradiating the admixture with certain wavelengths of electromagnetic radiation.

The leuco dye composition of the present invention can be irradiated with radiation having a wavelength of between about 4 to about 1,000 nanometers depending upon the radiation transorber that is present in the composition. Thus, the radiation may be ultraviolet radiation, including near ultraviolet and far or vacuum ultraviolet radiation; visible radiation; and near infrared radiation. Desirably, the composition is irradiated with radiation having a wavelength of from about 4 to about 700 nanometers. More desirably, the composition of the present invention is irradiated with ultraviolet radiation having a wavelength of from about 4 to about 400 nanometers. It is more desirable that the radiation have a wavelength of between about 100 to 375 nanometers.

In another embodiment, the pre-dye composition is applied to a substrate before being irradiated with ultraviolet radiation. The present invention is also related to a substrate having an image thereon that is formed by the leuco dye composition of the present invention. It is desirable that the mutated dye is stable.

Although the leuco dye and the radiation transorber have been described as separate compounds, they can be part of the same molecule, in which case the single molecule is designated a pre-dye. For example, the dye and the radiation transorber can be covalently coupled to each other, either directly, or indirectly through a relatively small molecule or spacer. Alternatively, the dye and radiation transorber can be covalently coupled to a large molecule, such as an oligomer or a polymer. Further, the dye and radiation transorber may be associated with a large molecule by van der Waals forces, and hydrogen bonding, among other means. Other variations will be readily apparent to those having ordinary skill in the art.

The pre-dye and the leuco dye/radiation transorber admixtures of the present invention may optionally contain a molecular includant having a chemical structure which defines at least one cavity. Thus, the cavity in the molecular includant can be a tunnel through the molecular includant or a cave-like space or a dented-in space in the molecular includant. The cavity can be isolated or independent, or connected to one or more other cavities.

The molecular includant can be inorganic or organic in nature. In certain embodiments, the chemical structure of the molecular includant is adapted to form a molecular inclusion complex. The molecular includants include, but are not limited to, clathrates, zeolites, and cyclodextrins. Examples of cyclodextrins include, but are not limited to, α-cyclodextrin, β-cyclodextrin, γ-cyclodextrin, hydroxypropyl β-cyclodextrin, hydroxyethyl β-cyclodextrin, sulfated β-cyclodextrin, hydroxyethyl α cyclodextrin, carboxymethyle α cyclodextrin, carboxymethyl β-cyclodextrin, carboxymethyl γ cyclodextrin, octyl succinated α cyclodextrin, octyl succinated β-cyclodextrin, octyl succinated γ cyclodextrin and sulfated β and γ-cyclodextrin (American Maize-Products Company, Hammond, Ind.).

The desired molecular includant is a cyclodextrin. More particularly, in some embodiments, the desired molecular includant is an α-cyclodextrin. In other embodiments, the desired molecular includant is a β-cyclodextrin. In yet other embodiments, the desired molecular includant is γ-cyclodextrin.

In those embodiments where the leuco dye molecule and the radiation transorber are admixed, each of the leuco dye and radiation transorber is optionally associated with one or more molecular includants. In some embodiments, the leuco dye is at least partially included within a cavity of the molecular includant and the radiation transorber is associated with the molecular includant outside of the cavity. In some embodiments, the radiation transorber is covalently coupled to the outside of the molecular includant.

For example, the leuco dye and/or the radiation transorber can be maintained in close proximity to the molecular includant by hydrogen bonding, van der Waals forces, or the like. The term "associated", in its broadest sense, means that the leuco dye and the radiation transorber are at least in close proximity to the molecular includant. Alternatively, either or both of the leuco dye and the radiation transorber can be covalently bonded to the molecular includant. In certain embodiments, the leuco dye will be associated with the molecular includant by means of hydrogen bonding and/or van der Waals forces or the like, while the radiation transorber is covalently bonded to the molecular includant. In other embodiments, the leuco dye is at least partially included within the cavity of the molecular includant, and the radiation transorber is located outside of the cavity of the molecular includant. It is to be understood that one or more radiation transorbers may be associated with one molecular includant, one or more leuco dyes may be associated with one molecular includant, or one or more of both may be associated with one molecular includant. It is also to be understood that one or more pre-dyes may be associated with a molecular includant, or one pre-dye may be associated with more than one molecular includant.

In several embodiments, the radiation transorber molecule, the wavelength-selective sensitizer, or the photoreactor may be associated with a molecular includant. It is to be noted that the number of such molecules can be between approximately 1 and approximately 21 molecules per molecular includant. Of course, in certain situations, there can be more than 21 molecules per molecular includant molecule. Desirably, there are more than three of such molecules per molecular includant.

The degree of substitution of the functionalized molecular includant may be in a range of from 1 to approximately 21.

As another example, the degree of substitution may be in a range of from 3 to about 10. As a further example, the degree of substitution may be in a range of from about 4 to about 9.

The leuco dye may be associated with the functionalized molecular includant. The term "associated" in its broadest sense means that the leuco dye is at least in close proximity to the functionalized molecular includant. For example, the leuco dye may be maintained in close proximity to the functionalized molecular includant by hydrogen bonding, van der Waals forces, or the like. Alternatively, the leuco dye may be covalently bonded to the functionalized molecular includant, although this normally is neither desired nor necessary. As a further example, the leuco dye may be at least partially included within the cavity of the functionalized molecular includant.

The examples below disclose methods of preparing and associating colorants and ultraviolet radiation transorbers to β-cyclodextrins. For illustrative purposes only, Examples 6, 7, 11, and 12 disclose one or more methods of preparing and associating colorants and ultraviolet radiation transorbers to cyclodextrins.

In those embodiments of the present invention in which the ultraviolet radiation transorber is covalently coupled to the molecular includant, the efficiency of energy transfer from the ultraviolet radiation transorber to the leuco dye is, at least in part, a function of the number of ultraviolet radiation transorber molecules which are attached to the molecular includant.

Accordingly, the present invention also relates to a composition which includes a leuco dye and a functionalized molecular includant. For illustrative purposes only, Examples 14 through 21, and 23 through 24 disclose other methods of preparing and associating colorants and ultraviolet radiation transorbers to cyclodextrins, wherein more than two molecules of the ultraviolet radiation transorber are covalently coupled to each molecule of the molecular includant.

The present invention also provides a method of making a functionalized molecular includant. The method of making a functionalized molecular includant involves the steps of providing a derivatized ultraviolet radiation transorber having a nucleophilic group, providing a derivatized molecular includant having more than two leaving groups per molecule, and reacting the derivatized ultraviolet radiation transorber with the derivatized molecular includant under conditions sufficient to result in the covalent coupling of an average of more than two ultraviolet radiation transorber molecules to each molecular includant molecule. By way of example, the derivatized ultraviolet radiation transorber may be 2-[p-(2-methyl-2-mercaptomethylpropionyl)phenoxy] ethyl 1,3-dioxo-2-isoindoline-acetate. As another example, the derivatized ultraviolet radiation transorber may be 2-mercaptomethyl-2-methyl-4'-[2-[p-(3-oxobutyl)phenoxy] ethoxy]propiophenone.

In general, the derivatized ultraviolet radiation transorber and the derivatized molecular includant are selected to cause the covalent coupling of the ultraviolet radiation transorber to the molecular includant by means of a bimolecular nucleophilic substitution reaction. Consequently, the choice of the nucleophilic group and the leaving groups and the preparation of the derivatized ultraviolet radiation transorber and derivatized molecular includant, respectively, may be readily accomplished by those having ordinary skill in the art without the need for undue experimentation.

The nucleophilic group of the derivatized ultraviolet radiation transorber may be any nucleophilic group capable of participating in a bimolecular nucleophilic substitution reaction, provided, of course, that the reaction results in the covalent coupling of more than two molecules of the ultraviolet radiation transorber to the molecular includant. The nucleophilic group generally will be a Lewis base, i.e., any group having an unshared pair of electrons. The group may be neutral or negatively charged. Examples of nucleophilic groups include, by way of illustration only, aliphatic hydroxy, aromatic hydroxy, alkoxides, carboxy, carboxylate, amino, and mercapto.

Similarly, the leaving group of the derivatized molecular includant may be any leaving group capable of participating in a bimolecular nucleophilic substitution reaction, again provided that the reaction results in the covalent coupling of more than two molecules of the ultraviolet radiation transorber to the molecular includant. Examples of leaving groups include, also by way of illustration only, p-toluenesulfonates (tosylates), p-bromobenzenesulfonates (brosylates), p-nitrobenzenesulfonates (nosylates), methanesulfonates (mesylates), oxonium ions, alkyl perchlorates, ammonioalkane sulfonate esters (betylates), alkyl fluorosulfonates, trifluoromethanesulfonates (triflates), nonafluorobutanesulfonates (nonaflates), and 2,2,2-trifluoroethanesulfonates (tresylates).

The reaction of the derivatized ultraviolet radiation transorber with the derivatized molecular includant is carried out in solution. The choice of solvent depends upon the solubilities of the two derivatized species. As a practical matter, a particularly useful solvent is N,N-dimethylformamide (DMF).

The reaction conditions, such as temperature, reaction time, and the like generally are matters of choice based upon the natures of the nucleophilic and leaving groups. Elevated temperatures usually are not required. For example, the reaction temperature may be in a range of from about 0° C. to around ambient temperature, i.e., to 20°–25° C.

The preparation of the functionalized molecular includant as described above generally is carried out in the absence of the colorant or leuco dye. However, the leuco dye may be associated with the derivatized molecular includant before reacting the derivatized ultraviolet radiation transorber with the derivatized molecular includant, particularly if a degree of substitution greater than about three is desired. When the degree of substitution is about three, it is believed that the association of the leuco dye with the functionalized molecular includant still may permit the leuco dye to be at least partially included in a cavity of the functionalized molecular includant. At higher degrees of substitution, such as about six, steric hindrance may partially or completely prevent the leuco dye from being at least partially included in a cavity of the functionalized molecular includant. Consequently, the leuco dye may be associated with the derivatized molecular includant which normally will exhibit little, if any, steric hindrance. In this instance, the leuco dye will be at least partially included in a cavity of the derivatized molecular includant. The above-described bimolecular nucleophilic substitution reaction then may be carried out to give a composition of the present invention in which a leuco dye is at least partially included in a cavity of the functionalized molecular includant.

Example 5 describes a method of producing color by irradiating a leuco dye admixed with a radiation transorber attached to a β-cyclodextrin.

The present invention is further described by the examples which follow. Such examples, however, are not to be construed as limiting in any way either the spirit or scope of the present invention. In the examples, all parts are parts by weight unless stated otherwise.

EXAMPLE 1

Preparation of a pinocol type starting material.

The starting material for the pre-dye molecule which will have a blue color when irradiated is prepared according to the following reaction:

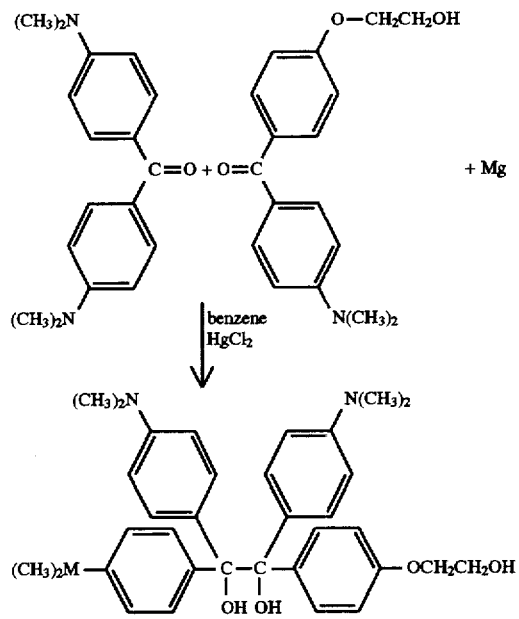

In a 500 ml round bottom 3-necked flask fitted with a magnetic stir bar, condenser, addition funnel was placed 10 g (0.037 mole) bis dimethylaminobenzophenone (Aldrich Chemical Company, Inc., Milwaukee, Wis.), 1 g hydroxy ethyl-dimethyl amino benzophenone (Aldrich Chemical Company, Inc., Milwaukee, Wis.) and 0.75 g magnesium shavings (Aldrich Chemical Company, Inc., Milwaukee, Wis.). 200 ml of anhydrous benzene was poured into the reaction mixture and was heated to 50° C. and 0.84 g of mercury chloride in 20 ml benzene was slowly added over 20 minutes. The reaction was initiated by adding a small crystal of iodine to the flask. The reaction mixture was heated for 30 minutes. The organic layer was separated, dried and the solvent removed under reduced pressure to yield a yellow solid. The product was run on a short silica column with 50% ethyl acetate in hexane as solvent.

Mass Spec: 538 (m+—OH), 521, 480, 252

EXAMPLE 2

The product from Example 1 was treated according to the following reaction:

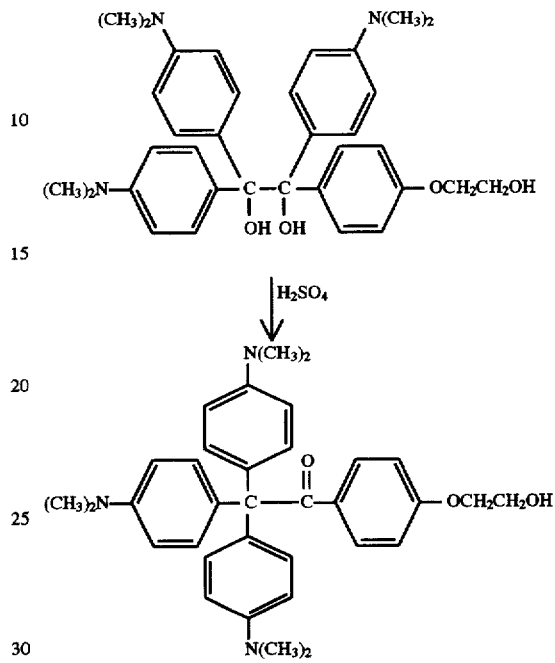

To a 250 ml round bottomed flask was added 5.0 g (9 mmole) of the diol from Example 1, and a magnetic stir bar. 50 ml of 50% concentrated sulfuric acid in water was added and the reaction mixture stirred in an ice bath for 1 hour. The pH of the reaction mixture was then brought up to approximately 7.0 by addition of sodium hydroxide. The precipitate was filtered and dried under vacuum for 2 hours. The yield was 4.2 g (88%).

Mass Spec: 537 (m$^+$), 520, 448, 433

EXAMPLE 3

The product from Example 2 was subjected to the following reaction:

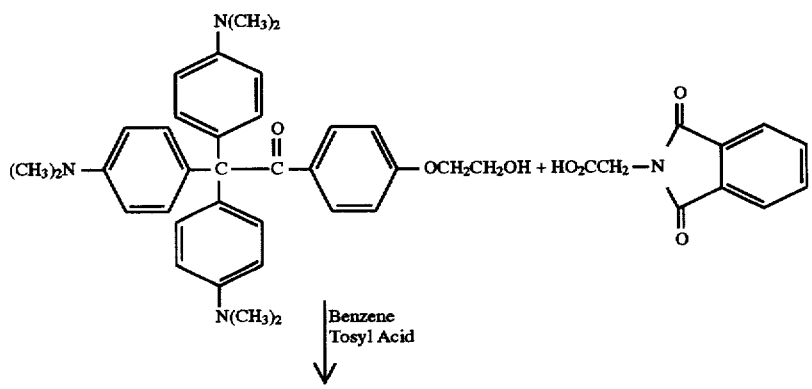

-continued

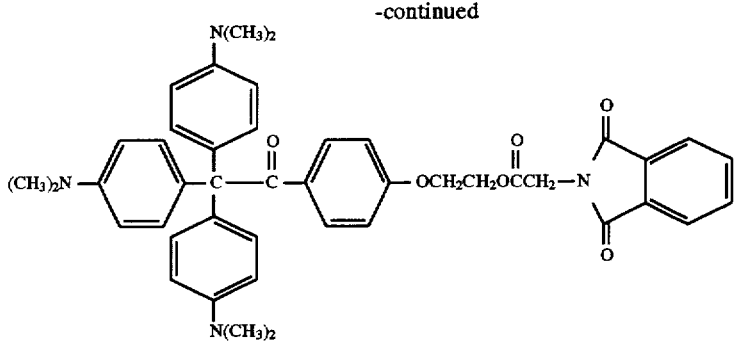

15

In a 250 ml round bottom flask fitted with a magnetic stir bar, Dean & Stark adaptor and condensor was added 4.0 g (7.6 mmole) ketone from Example 2, 1.5 g phthaloylglycine (Aldrich Chemical Company, Inc., Milwaukee, Wis.), 0.1 g p-toluenesulphuric acid (Aldrich Chemical Company, Inc., Milwaukee, Wis.) and 100 ml of anhydrous benzene (Aldrich Chemical Company, Inc., Milwaukee, Wis.). The reaction mixture was heated at reflux for 8 hours after which time 0.3 ml of water had been collected in the adaptor. Removal of the solvent under reduced pressure gave 5.0 g of product.

EXAMPLE 4

0.2 g of the product from Example 3 compound was dissolved in 5 ml of acetonitrile (Fisher Scientific, Pittsburgh, Pa.). 3 drops of the mixture was placed on a metal plate (Q-panel) and spread out with the aid of a spatula. The plate was then exposed to 222 nm excimer radiation at 40 ft/minute on the conveyer. A deep blue color developed on radiation.

Four drops were placed on a sheet of white paper (Neenah bond) and allowed to spread out. The moist sheet was then exposed to 222 nm excimer radiation. The moist area turned a deep blue in color.

EXAMPLE 5

A leuco dye (leuco crystal violet) (Aldrich Chemical Company, Inc., Milwaukee, Wis.) was mixed with a composition comprising a radiation transorber attached to a β-cyclodextrin represented by the following formula:

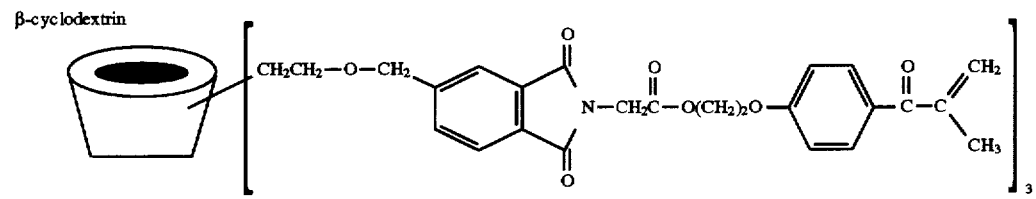

The synthesis of the radiation transorber attached to a β-cyclodextrin is described in Examples 8–11, and in copending U.S. patent application Ser. No. 08/461,372 filed on Jun. 5, 1995, now abandoned, and incorporated herein by reference. 0.1 g leuco crystal violet dye and 0.2 g a radiation transorber attached to a β-cyclodextrin was mixed in 5 ml acetonitrile (Fisher Scientific, Pittsburgh, Pa.). The colorless solution was placed on a metal plate (Q-panel) and spread out with a spatula (approximately 5 drops of solution). The plate was passed under the 222 nm excimer lamp (35 ft/minute on the conveyer) after which the solution had turned a deep blue in color. This was repeated by putting 3 drops onto paper (Neenah Bond) and spreading it with a spatula. Passing the moist paper under a 222 nm dielectric barrier discharge excimer lamp (Haraus Noblelight AG, Hanau, Germany) developed a blue color. Leuco dye by itself did not develop any color on irradiation with 222 nm.

EXAMPLE 6

This example describes the preparation of a b-cyclodextrin molecular includant having (1) an ultraviolet radiation transorber covalently bonded to the cyclodextrin outside of the cavity of the cyclodextrin, and (2) a colorant associated with the cyclodextrin by means of hydrogen bonds and/or van der Waals forces.

A. Friedel-Crafts Acylation of Transorber

A 250-ml, three-necked, round-bottomed reaction flask was fitted with a condenser and a pressure-equalizing addition funnel equipped with a nitrogen inlet tube. A magnetic stirring bar was placed in the flask. While being flushed with nitrogen, the flask was charged with 10 g (0.05 mole) of 1-hydroxycyclohexyl phenyl ketone (IRGACURE® 184, Ciba-Geigy Corporation, Hawthorne, N.Y.), 100 ml of anhydrous tetrahydofuran (Aldrich Chemical Company, Inc., Milwaukee, Wis.), and 5 g (0.05 mole) of succinic anhydride (Aldrich Chemical Co., Milwaukee, Wis.). To the continuously stirred contents of the flask then was added 6.7 g of anhydrous aluminum chloride (Aldrich Chemical Co., Milwaukee, Wis.). The resulting reaction mixture was maintained at about 0° C. in an ice bath for about one hour, after which the mixture was allowed to warm to ambient temperature for two hours. The reaction mixture then was poured into a mixture of 500 ml of ice water and 100 ml of diethyl ether. The ether layer was removed after the addition of a small amount of sodium chloride to the aqueous phase to aid phase separation. The ether layer was dried over anhydrous magnesium sulfate. The ether was removed under reduced pressure, leaving 12.7 g (87 percent) of a white crystalline powder. The material was shown to be 1-hydroxycyclohexyl 4-(2-carboxyethyl) carbonylphenyl ketone by nuclear magnetic resonance analysis.

B. Preparation of Acylated Transorber Acid Chloride

A 250-ml round-bottomed flask fitted with a condenser was charged with 12.0 g of 1-hydroxycyclohexyl 4-(2-carboxyethyl) carbonylphenyl ketone (0.04 mole), 5.95 g (0.05 mole) of thionyl chloride (Aldrich Chemical Co., Milwaukee, Wis.), and 50 ml of diethyl ether. The resulting reaction mixture was stirred at 30° C. for 30 minutes, after which time the solvent was removed under reduced pressure. The residue, a white solid, was maintained at 0.01 Torr for 30 minutes to remove residual solvent and excess thionyl chloride, leaving 12.1 g (94 percent) of 1-hydroxycyclohexyl 4-(2-chloroformylethyl) carbonylphenyl ketone.

C. Covalent Bonding of Acylated Transorber to Cyclodextrin

A 250-ml, three-necked, round-bottomed reaction flask containing a magnetic stirring bar and fitted with a thermometer, condenser, and pressure-equalizing addition funnel equipped with a nitrogen inlet tube was charged with 10 g (9.8 mmole) of β-cyclodextrin (American Maize-Products Company, Hammond, Ind.), 31.6 g (98 mmoles) of 1-hydroxycyclohexyl 4-(2-chloroformylethyl) carbonylphenyl ketone, and 100 ml of N,N-dimethylformamide while being continuously flushed with nitrogen. The reaction mixture was heated to 50° C. and 0.5 ml of triethylamine added. The reaction mixture was maintained at 50° C. for an hour and allowed to cool to ambient temperature. In this preparation, no attempt was made to isolate the product, a β-cyclodextrin to which an ultraviolet radiation transorber had been covalently coupled (referred to hereinafter for convenience as β-cyclodextrin-transorber).

The foregoing procedure was repeated to isolate the product of the reaction. At the conclusion of the procedure as described, the reaction mixture was concentrated in a rotary evaporator to roughly 10 percent of the original volume. The residue was poured into ice water to which sodium chloride then was added to force the product out of solution. The resulting precipitate was isolated by filtration and washed with diethyl ether. The solid was dried under reduced pressure to give 24.8 g of a white powder. In a third preparation, the residue remaining in the rotary evaporator was placed on top of an approximately 7.5-cm column containing about 15 g of silica gel. The residue was eluted with N,N-dimethylformamide, with the eluant being monitored by means of WHATMAN® Flexible-Backed TLC Plates (Catalog No. 05-713-161, Fisher Scientific, Pittsburgh, Pa.). The eluted product was isolated by evaporating the solvent. The structure of the product was verified by nuclear magnetic resonance analysis.

D. Association of Colorant with Cyclodextrin-Transorber-Preparation of Colored Composition To a solution of 10 g (estimated to be about 3.6 mmole) of β-cyclodextrin-transorber in 150 ml of N,N-dimethylformamide in a 250-ml round-bottomed flask was added at ambient temperature 1.2 g (3.6 mmole) of Malachite Green oxalate (Aldrich Chemical Company, Inc., Milwaukee, Wis.), referred to hereinafter as Colorant A for convenience. The reaction mixture was stirred with a magnetic stirring bar for one hour at ambient temperature. Most of the solvent then was removed in a rotary evaporator and the residue was eluted from a silica gel column as already described. The β-cyclodextrin-transorber Colorant A inclusion complex moved down the column first, cleanly separating from both free Colorant A and β-cyclodextrin-transorber. The eluant containing the complex was collected and the solvent removed in a rotary evaporator. The residue was subjected to a reduced pressure of 0.01 Torr to remove residual solvent to yield a blue-green powder.

E. Mutation of Colored Composition

The β-cyclodextrin-transorber Colorant A inclusion complex was exposed to ultraviolet radiation from two different lamps, Lamps A and B. Lamp A was a 222-nanometer excimer lamp assembly organized in banks of four cylindrical lamps having a length of about 30 cm. The lamps were cooled by circulating water through a centrally located or inner tube of the lamp and, as a consequence, they operated at a relatively low temperature, i.e., about 50° C. The power density at the lamp's outer surface typically is in the range of from about 4 to about 20 joules per square meter ($J/m^2$). However, such range in reality merely reflects the capabilities of current excimer lamp power supplies; in the future, higher power densities may be practical. The distance from the lamp to the sample being irradiated was 4.5 cm. Lamp B was a 500-watt Hanovia medium pressure mercury lamp (Hanovia Lamp Co., Newark, N.J.). The distance from Lamp B to the sample being irradiated was about 15 cm.

A few drops of an N,N-dimethylformamide solution of the β-cyclodextrin-transorber Colorant A inclusion complex were placed on a TLC plate and in a small polyethylene weighing pan. Both samples were exposed to Lamp A and were decolorized (mutated to a colorless state) in 15-20 seconds. Similar results were obtained with Lamp B in 30 seconds.

A first control sample consisting of a solution of Colorant A and β-cyclodextrin in N,N-dimethylformamide was not decolorized by Lamp A. A second control sample consisting of Colorant A and 1-hydroxycyclohexyl phenyl ketone in N,N-dimethylformamide was decolorized by Lamp A within 60 seconds. On standing, however, the color began to reappear within an hour.

To evaluate the effect of solvent on decolorization, 50 mg of the β-cyclodextrin-transorber Colorant A inclusion complex was dissolved in 1 ml of solvent. The resulting solution or mixture was placed on a glass microscope slide and exposed to Lamp A for 1 minute. The rate of decolorization, i.e., the time to render the sample colorless, was directly proportional to the solubility of the complex in the solvent, as summarized below.

TABLE 1

| Solvent | Solubility | Decolorization Time |
| --- | --- | --- |
| N,N-Dimethylformamide | Poor | 1 minute |
| Dimethylsulfoxide | Soluble | <10 seconds |
| Acetone | Soluble | <10 seconds |
| Hexane | Insoluble | — |
| Ethyl Acetate | Poor | 1 minute |

Finally, 10 mg of the β-cyclodextrin-transorber Colorant A inclusion complex were placed on a glass microscope slide and crushed with a pestle. The resulting powder was exposed to Lamp A for 10 seconds. The powder turned colorless. Similar results were obtained with Lamp B, but at a slower rate.

EXAMPLE 7

Because of the possibility in the preparation of the colored composition described in the following examples for the acylated transorber acid chloride to at least partially occupy the cavity of the cyclodextrin, to the partial or complete exclusion of colorant, a modified preparative procedure was carried out. Thus, this example describes the preparation of a β-cyclodextrin molecular includant having (1) a colorant at least partially included within the cavity of the cyclodextrin and associated therewith by means of hydrogen bonds and/or van der Waals forces, and (2) an ultraviolet radiation transorber covalently bonded to the cyclodextrin substantially outside of the cavity of the cyclodextrin.

A. Association of Colorant with a Cyclodextrin

To a solution of 10.0 g (9.8 mmole) of β-cyclodextrin in 150 ml of N,N-dimethylformamide was added 3.24 g (9.6 mmoles) of Colorant A. The resulting solution was stirred at ambient temperature for one hour. The reaction solution was concentrated under reduced pressure in a rotary evaporator to a volume about one-tenth of the original volume. The residue was passed over a silica gel column as described in Part C of Example 6. The solvent in the eluant was removed under reduced pressure in a rotary evaporator to give 12.4 g of a blue-green powder, β-cyclodextrin Colorant A inclusion complex.

B. Covalent Bonding of Acylated Transorber to Cyclodextrin Colorant Inclusion Complex—Preparation of Colored Composition A 250-ml, three-necked, round-bottomed reaction flask containing a magnetic stirring bar and fitted with a thermometer, condenser, and pressure-equalizing addition funnel equipped with a nitrogen inlet tube was charged with 10 g (9.6 mmole) of β-cyclodextrin Colorant A inclusion complex, 31.6 g (98 mmoles) of 1-hydroxycyclohexyl 4-(2-chloroformylethyl)carbonylphenyl ketone prepared as described in Part B of Example 6, and 150 ml of N,N-dimethylformamide while being continuously flushed with nitrogen. The reaction mixture was heated to 50° C. and 0.5 ml of triethylamine added. The reaction mixture was maintained at 50° C. for an hour and allowed to cool to ambient temperature. The reaction mixture then was worked up as described in Part A, above, to give 14.2 g of β-cyclodextrin-transorber Colorant A inclusion complex, a blue-green powder.

C. Mutation of Colored Composition

The procedures described in Part E of Example 6 were repeated with the β-cyclodextrin-transorber Colorant A inclusion complex prepared in Part B, above, with essentially the same results.

EXAMPLE 8

This example describes a method of preparing an ultraviolet radiation transorber, 2-[p-(2-methyllactoyl)phenoxy] ethyl 1,3-dioxo-2-isoindolineacetate, designated phthaloylglycine-2959.

The following was admixed in a 250 ml, three-necked, round bottomed flask fitted with a Dean & Stark adapter with condenser and two glass stoppers: 20.5 g (0.1 mole) of the wavelength selective sensitizer, phthaloylglycine (Aldrich Chemical Co., Milwaukee, Wis.); 24.6 g (0.1 mole) of the photoreactor, DARCUR®2959 (Ciba-Geigy, Hawthorne, N.Y.); 100 ml of benzene (Aldrich Chemical Co., Milwaukee, Wis.); and 0.4 g p-toluenesulfonic acid (Aldrich Chemical Co., Milwaukee, Wis.). The mixture was heated at reflux for 3 hours after which time 1.8 ml of water was collected. The solvent was removed under reduced pressure to give 43.1 g of white powder. The powder was recrystallized from 30% ethyl acetate in hexane (Fisher) to yield 40.2 g (93%) of a white crystalline powder having a melting point of 153°–4° C. The reaction is summarized as follows:

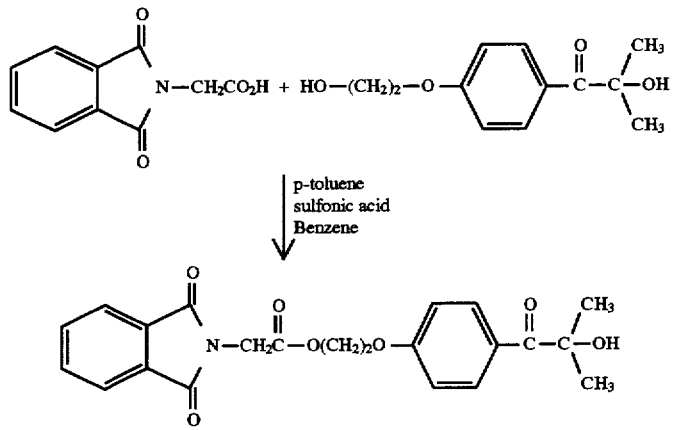

The resulting product, designated phthaloylglycine-2959, had the following physical parameters:

IR [NUJOL MULL] $v_{max}$ 3440, 1760, 1740, 1680, 1600 cm-1 1H NMR [CDCl3] ∂ppm 1.64[s], 4.25[m], 4.49 [m], 6.92[m], 7.25[m], 7.86[m], 7.98[m], 8.06[m] ppm

EXAMPLE 9

This example describes a method of dehydrating the phthaloylglycine-2959 produced in Example 8.

The following was admixed in a 250 ml round bottomed flask fitted with a Dean & Stark adapter with condenser: 21.6 g (0.05 mole) phthaloylglycine-2959; 100 ml of anhydrous benzene (Aldrich Chemical Co., Milwaukee, Wis.); and 0.1 g p-toluenesulfonic acid (Aldrich Chemical Co., Milwaukee, Wis.). The mixture was refluxed for 3 hours. After 0.7 ml of water had been collected in the trap, the solution was then removed under vacuum to yield 20.1 g (97%) of a white solid. However, analysis of the white solid showed that this reaction yielded only 15 to 20% of the desired dehydration product. The reaction is summarized as follows:

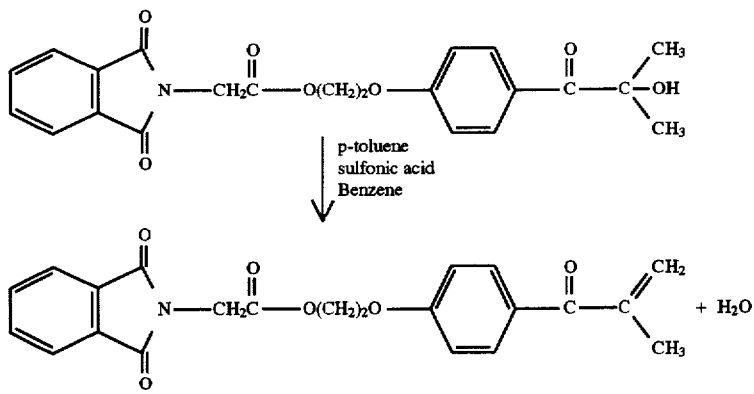

The resulting reaction product had the following physical parameters:

IR (NUJOL) $v_{max}$ 1617cm-1 (C=C—C=O)

EXAMPLE 10

This example describes the Nohr-MacDonald elimination reaction used to dehydrate the phthaloylglycine-2959 produced in Example 8.

Into a 500 ml round bottomed flask were placed a stirring magnet, 20.0 g (0.048 mole) of the phthaloylglycine-2959, and 6.6 g (0.048 mole) of anhydrous zinc chloride (Aldrich Chemical Co., Milwaukee, Wis.). 250 ml of anhydrous p-xylene (Aldrich Chemical Co., Milwaukee, Wis.) was added and the mixture refluxed under argon atmosphere for two hours. The reaction mixture was then cooled, resulting in a white precipitate which was collected. The white powder was then recrystallized from 20% ethyl acetate in hexane to yield 18.1 g (95%) of a white powder. The reaction is summarized as follows:

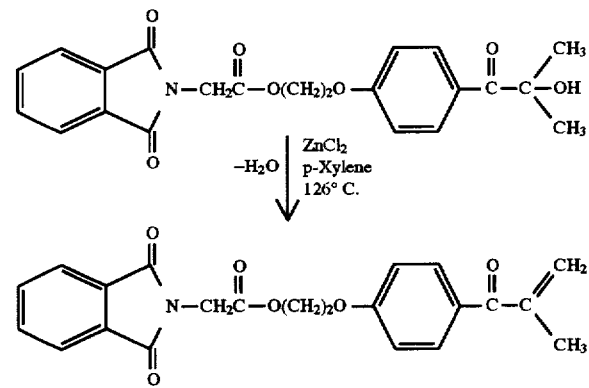

The resulting reaction product had the following physical parameters:

Melting Point: 138° C. to 140° C. Mass spectrum: m/e: 393 M +, 352, 326, 232, 160. IR (KB) $v_{max}$ 1758, 1708, 1677, 1600 cm-1 1H NMR [DMSO] ∂ppm 1.8(s), 2.6(s), 2.8 (d), 3.8 (d), 4.6 (m), 4.8 (m), 7.3(m), 7.4 (m), 8.3 (m), and 8.6 (d) 13C NMR [DMSO] ∂ppm 65.9 (CH2=)

EXAMPLE 11

This example describes a method of producing a β-cyclodextrin having dehydrated phthaloylglycine-2959 groups from Example 9 or 10 covalently bonded thereto.

The following was admixed in a 100 ml round-bottomed flask: 5.0 g (4 mmole) β-cyclodextrin (American Maize Product Company, Hammond, Ind.) (designated β-CD in the following reaction); 8.3 g (20 mmole) dehydrated phthaloylglycine-2959; 50 ml of anhydrous DMF; 20 ml of benzene; and 0.01 g p-tolulenesulfonyl chloride (Aldrich Chemical Co., Milwaukee, Wis.). The mixture was chilled in a salt/ice bath and stirred for 24 hours. The reaction mixture was poured into 150 ml of weak sodium bicarbonate solution and extracted three times with 50 ml ethyl ether. The aqueous layer was then filtered to yield a white solid comprising the β-cyclodextrin with phthaloylglycine-2959 group attached. A yield of 9.4 g was obtained. Reverse phase TLC plate using a 50:50 DMF:acetonitrile mixture showed a new product peak compared to the starting materials.

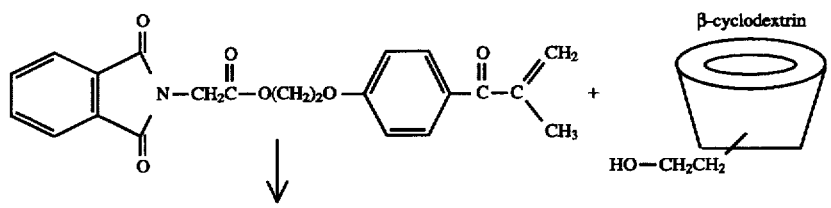

-continued

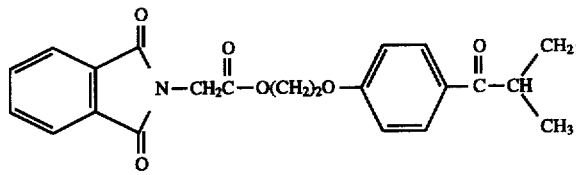

The β-cyclodextrin molecule has several primary alcohols and secondary alcohols with which the phthaloylglycine-2959 can react. The above representative reaction only shows a single phthaloylglycine-2959 molecule for illustrative purposes.

EXAMPLE 12

This example describes a method of associating a colorant and an ultraviolet radiation transorber with a molecular includant. More particularly, this example describes a method of associating the colorant crystal violet with the molecular includant β-cyclodextrin covalently bonded to the ultraviolet radiation transorber dehydrated phthaloylglycine-2959 of Example 11.

The following was placed in a 100 ml beaker: 4.0 g β-cyclodextrin having a dehydrated phthaloylglycine-2959 group; and 50 ml of water. The water was heated to 70° C. at which point the solution became clear. Next, 0.9 g (2.4 mmole) crystal violet (Aldrich Chemical Company, Milwaukee, Wis.) was added to the solution, and the solution was stirred for 20 minutes. Next, the solution was then filtered. The filtrand was washed with the filtrate and then dried in a vacuum oven at 84° C. A violet-blue powder was obtained having 4.1 g (92%) yield. The resulting reaction product had the following physical parameters:

U.V. Spectrum DMF $v_{max}$ 610 nm (cf cv $v_{max}$ 604 nm)

EXAMPLE 13

This example describes a method of producing the ultraviolet radiation transorber 4(4-hydroxyphenyl) butan-2-one-2959 (chloro substituted).

The following was admixed in a 250 ml round-bottomed flask fitted with a condenser and magnetic stir bar: 17.6 g (0.1 mole) of the wavelength selective sensitizer, 4(4-hydroxyphenyl) butan-2-one (Aldrich Chemical Company, Milwaukee, Wis.); 26.4 g (0.1 mole) of the photoreactor, chloro substituted DARCUR® 2959 (Ciba-Geigy Corporation, Hawthorne, N.Y.); 1.0 ml of pyridine (Aldrich Chemical Company, Milwaukee, Wis.); and 100 ml of anhydrous tetrahydrofuran (Aldrich Chemical Company, Milwaukee, Wis.). The mixture was refluxed for 3 hours and the solvent partially removed under reduced pressure (60% taken off). The reaction mixture was then poured into ice water and extracted with two 50 ml aliquots of diethyl ether. After drying over anhydrous magnesium sulfate and removal of solvent, 39.1 g of white solvent remained. Recrystallization of the powder from 30% ethyl acetate in hexane gave 36.7 g (91%) of a white crystalline powder, having a melting point of 142°-3° C. The reaction is summarized in the following reaction:

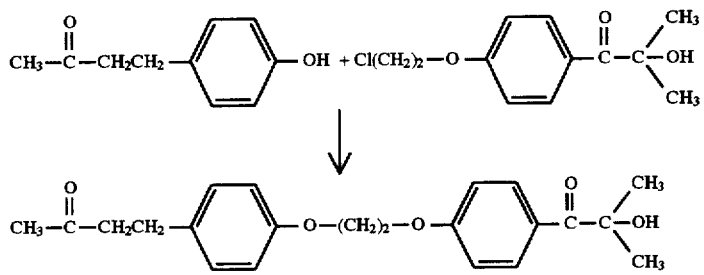

The resulting reaction product had the following physical parameters:

IR [NUJOL MULL] $v_{max}$ 3460, 1760, 1700, 1620, 1600 cm-1 1H [CDCl3] δppm 1.62[s], 4.2[m], 4.5[m], 6.9[m] ppm The ultraviolet radiation transorber produced in this example, 4(4-hydroxyphenyl) butan-2-one-2959 (chloro substituted), may be associated with β-cyclodextrin and a leuco dye such as the leuco form of crystal violet, using the methods described above wherein 4(4-hydroxyphenyl) butan-2-one-2959 (chloro substituted) would be substituted for the dehydrated phthaloylglycine-2959.

EXAMPLE 14

Preparation of epoxide intermediate of dehydrated phthaloylglycine-2959

The epoxide intermediate of dehydrated phthaloylglycine 2959 was prepared according to the following reaction:

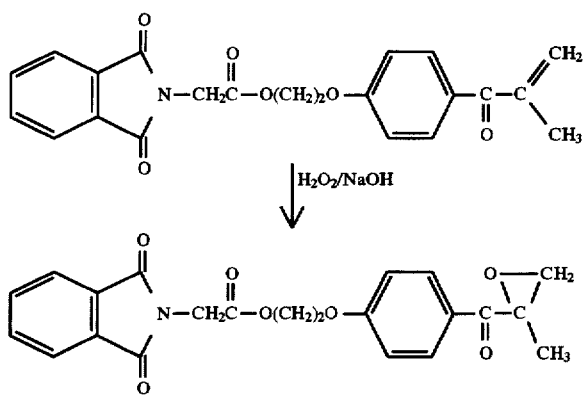

In a 250 ml, three-necked, round bottomed flask fitted with an addition funnel, thermometer and magnetic stirrer was placed 30.0 g (0.076 mol) of the dehydrated phthaloylglycine-2959, 70 ml methanol and 20.1 ml hydrogen peroxide (30% solution). The reaction mixture was stirred and cooled in a water/ice bath to maintain a temperature in the range 15°–20° C. 5.8 ml of a 6N NaOH solution was placed in the addition funnel and the solution was slowly added to maintain the reaction mixture temperature of 15°–20° C. This step took about 4 minutes. The mixture was then stirred for 3 hours at about 20°–25° C. The reaction mixture was then poured into 90 ml of water and extracted with two 70 ml portions of ethyl ether. The organic layers were combined and washed with 100 ml of water, dried with anhydrous MgSO$_4$, filtered, and the ether removed on a rotary evaporator to yield a white solid (yield 20.3 g, 65%). The IR showed the stretching of the C—O—C group and the material was used without further purification.

EXAMPLE 15

Attachment of epoxide intermediate to thiol cyclodextrin

The attachment of the epoxide intermediate of dehydrated phthaloylglycine 2959 was done according to the following reaction:

In a 250 ml 3-necked round bottomed flask fitted with a stopper and two glass stoppers, all being wired with copper wire and attached to the flask with rubber bands, was placed 30.0 g (0.016 mol) thiol cyclodextrin and 100 ml of anhydrous dimethylformamide (DMF) (Aldrich Chemical Co., Milwaukee, Wis.). The reaction mixture was cooled in a ice bath and 0.5 ml diisopropyl ethyl amine was added. Hydrogen sulfide was bubbled into the flask and a positive pressure maintained for 3 hours. During the last hour, the reaction mixture was allowed to warm to room temperature.

The reaction mixture was flushed with argon for 15 minutes and then poured into 70 ml of water to which was then added 100 ml acetone. A white precipitate occurred and was filtered to yield 20.2 g (84.1 %) of a white powder which was used without further purification.

In a 250 ml round bottomed flask fitted with a magnetic stirrer and placed in an ice bath was placed 12.7 (0.031 mol), 80 ml of anhydrous DMF (Aldrich Chemical Co., Milwaukee, Wis.) and 15.0 g (0.010 mol) thiol CD. After the reaction mixture was cooled, 0.5 ml of diisopropyl ethyl amine was added and the reaction mixture stirred for 1 hour at 0° C. to 5° C. followed by 2 hours at room temperature. The reaction mixture was then poured into 200 ml of ice water and a white precipitate formed immediately. This was filtered and washed with acetone. The damp white powder was dried in a convection oven at 80° C. for 3 hours to yield a white powder. The yield was 24.5 g (88%).

EXAMPLE 16

Insertion of Victoria Pure Blue in the cyclodextrin cavity

In a 250 ml Erlenmeyer flask was placed a magnetic stirrer, 40.0 g (0.014 mol) of the compound produced in Example 15 and 100 ml water. The flask was heated on a hot plate to 80° C. When the white cloudy mixture became clear, 7.43 g (0.016 mol) of Victoria Pure Blue BO powder was then added to the hot solution and stirred for 10 minutes then allowed to cool to 50° C. The contents were then filtered and washed with 20 ml of cold water.

The precipitate was then dried in a convention oven at 80° C. for 2 hours to yield a blue powder 27.9 g (58.1%).

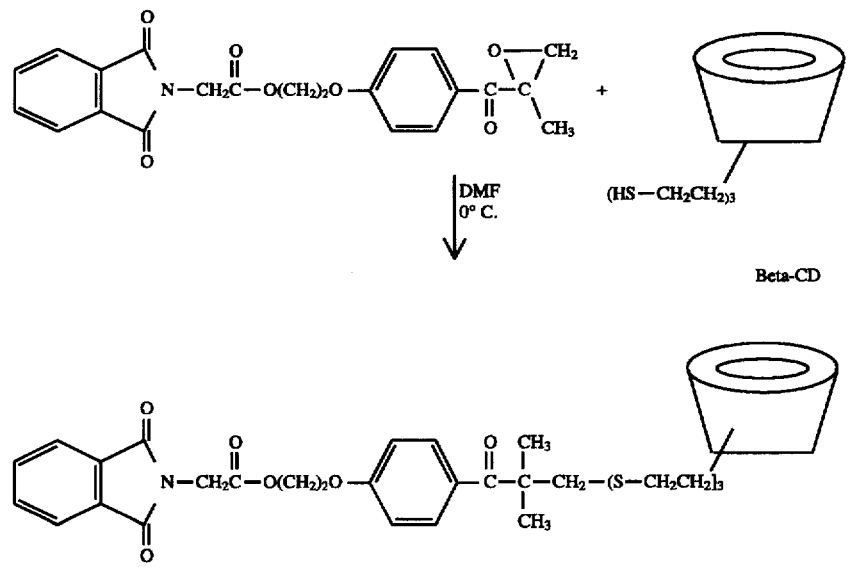

EXAMPLE 17

The preparation of a tosylated cyclodextrin with the dehydroxy phthaloylglycine 2959 attached thereto is performed by the following reactions:

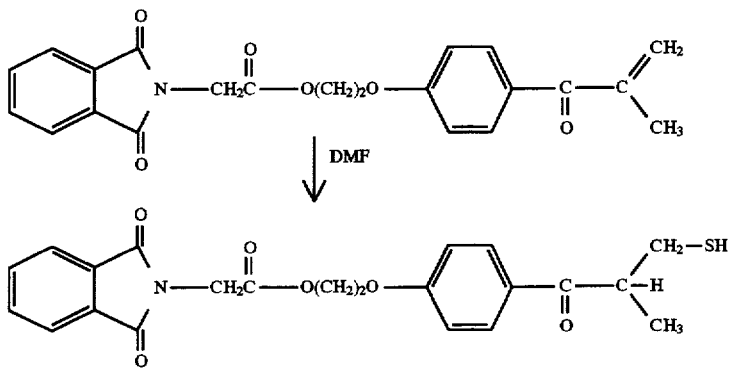

To a 500 ml 3-necked round bottomed flask fitted with a bubble tube, condenser and addition funnel, was placed 10 g (0.025 mole) of the dehydrated phthaloylglycine 2959 in 150 ml of anhydrous N,N-diethylformamide (Aldrich Chemical Co., Milwaukee, Wis.) cooled to 0° C. in an ice bath and stirred with a magnetic stirrer. The synthesis was repeated except that the flask was allowed to warm up to 60° C. using a warm water bath and the $H_2S$ pumped into the reaction flask till the stoppers started to move (trying to release the pressure). The flask was then stirred under these conditions for 4 hours. The saturated solution was kept at a positive pressure of $H_2S$. The stoppers were held down by wiring and rubber bands. The reaction mixture was then allowed to warm-up overnight. The solution was then flushed with argon for 30 minutes and the reaction mixture poured onto 50 g of crushed ice and extracted three times (3×80 ml) with diethyl ether (Aldrich Chemical Co., Milwaukee, Wis.).

The organic layers were condensed and washed with water and dried with $MgSO_4$. Removal of the solvent on a rotary evaporator gave 5.2 g of a crude product. The product was purified on a silica column using 20% ethyl acetate in hexane as eluant. 4.5 g of a white solid was obtained.

A tosylated cyclodextrin was prepared according to the following reaction:

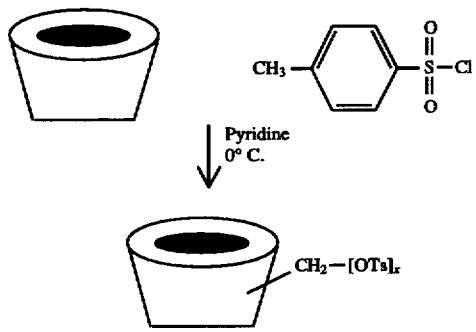

To a 100 ml round bottomed flask was placed 6.0 g β-cyclodextrin (American Maize Product Company), 10.0 g (0.05 mole) p-toluenesulfonyl chloride (Aldrich Chemical Co., Milwaukee, Wis.), 50 ml of pH 10 buffer solution (Fisher). The resultant mixture was stirred at room temperature for 8 hours after which it was poured on ice (approximately 100 g) and extracted with diethyl ether. The aqueous layer was then poured into 50 ml of acetone (Fisher) and the resultant, cloudy mixture filtered. The resultant white powder was then run through a sephadex column (Aldrich Chemical Co., Milwaukee, Wis.) using n-butanol, ethanol, and water (5:4:3 by volume) as eluant to yield a white powder. The yield was 10.9%.

The degree of substitution of the white powder (tosyl-cyclodextrin) was determined by $^{13}C$ NMR spectroscopy (DMF-d6) by comparing the ratio of hydroxysubstituted carbons versus tosylated carbons, both at the 6 position. When the 6-position carbon bears a hydroxy group, the NMR peaks for each of the six carbon atoms are given in Table 5.

TABLE 5

| Carbon Atom | NMR Peak (ppm) |
|---|---|
| 1 | 101.8 |
| 2 | 72.9 |
| 3 | 72.3 |
| 4 | 81.4 |
| 5 | 71.9 |
| 6 | 59.8 |

The presence of the tosyl group shifts the NMR peaks of the 5-position and 6-position carbon atoms to 68.8 and 69.5 ppm, respectively.

The degree of substitution was calculated by integrating the NMR peak for the 6-position tosylated carbon, integrating the NMR peak for the 6-position hydroxy-substituted carbon, and dividing the former by the latter. The integrations yielded 23.6 and 4. 1, respectively, and a degree of substitution of 5.9. Thus, the average degree of substitution in this example is about 6.

The tosylated cyclodextrin with the dehydroxy phthaloylglycine 2959 attached was prepared according to the following reaction:

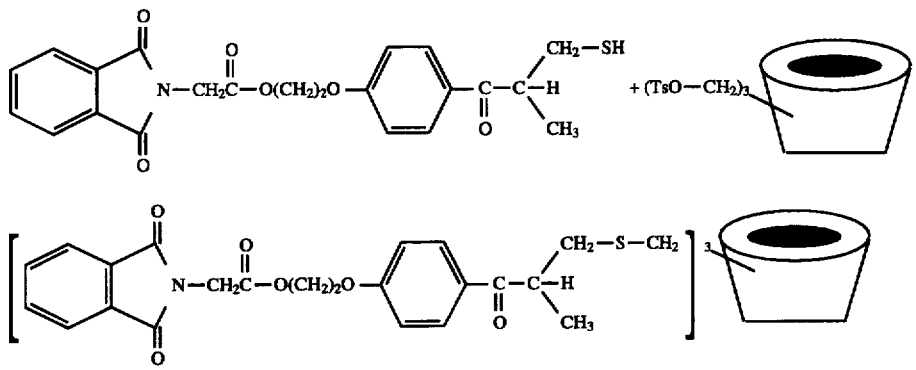

To a 250 ml round bottomed flask was added 10.0 g (4–8 mole) of tosylated substituted cyclodextrin, 20.7 g (48 mmol) of thiol (mercapto dehydrated phthaloylglycine 2959) in 100 ml of DMF. The reaction mixture was cooled to 0° C. in an ice bath and stirred using a magnetic stirrer. To the solution was slowly dropped in 10 ml of ethyl diisopropylamine (Aldrich Chemical Co., Milwaukee, Wis.) in 20 ml of DMF. The reaction was kept at 0° C. for 8 hours with stirring. The reaction mixture was extracted with diethyl ether. The aqueous layer was then treated with 500 ml of acetone and the precipitate filtered and washed with acetone. The product was then run on a sephadex column using n-butanol, ethanol, and water (5:4:3 by volume) to yield a white powder. The yield was 16.7 g.

The degree of substitution of the functionalized molecular includant was determined as described above. In this case, the presence of the derivatized ultraviolet radiation transorber shifts the NMR peak of the 6-position carbon atom to 63.1. The degree of substitution was calculated by integrating the NMR peak for the 6-position substituted carbon, integrating the NMR peak for the 6-position hydroxy-substituted carbon, and dividing the former by the latter. The integrations yielded 67.4 and 11.7, respectively, and a degree of substitution of 5.7. Thus, the average degree of substitution in this example is about 6. The reaction above shows the degree of substitution to be "n". Although n represents the value of substitution on a single cyclodextrin, and therefore, can be from 0 to 24, it is to be understood that the average degree of substitution is about 6.

EXAMPLE 18

The procedure of Example 17 was repeated, except that the amounts of β-cyclodextrin and p-toluenesulfonic acid (Aldrich) were 6.0 g and 5.0 g, respectively. In this case, the degree of substitution of the cyclodextrin was found to be about 3.

EXAMPLE 19

The procedure of Example 17 was repeated, except that the derivatized molecular includant of Example 18 was employed in place of that from Example 17. The average degree of substitution of the functionalized molecular includant was found to be about 3.

EXAMPLE 20

This example describes the preparation of a colored composition which includes a mutable colorant and the functionalized molecular includant from Example 17.

In a 250-ml Erlenmeyer flask containing a magnetic stirring bar was placed 20.0 g (5.4 mmoles) of the functionalized molecular includant obtained in Example 17 and 100 g of water. The water was heated to 80° C., at which temperature a clear solution was obtained. To the solution was added slowly, with stirring, 3.1 g (6.0 mmoles) of Victoria Pure Blue BO (Aldrich). A precipitate formed which was removed from the hot solution by filtration. The precipitate was washed with 50 ml of water and dried to give 19.1 g (84 percent) of a blue powder, a colored composition consisting of a mutable colorant, Victoria Pure Blue BO, and a molecular includant having covalently coupled to it an average of about six ultraviolet radiation transorber molecules per molecular includant molecule.

EXAMPLE 21

The procedure of Example 20 was repeated, except that the functionalized molecular includant from Example 19 was employed in place of that from Example 17.

EXAMPLE 22

This example describes mutation or decolorization rates for the compositions of Examples 12 (wherein the β-cyclodextrin has dehydrated phthaloyl glycine-2959 from Example 9 covalently bonded thereto), 20 and 21.

In each case, approximately 10 mg of the composition was placed on a steel plate (Q-Panel Company, Cleveland, Ohio). Three drops (about 0.3 ml) of acetonitrile (Burdick & Jackson, Muskegon, Mich.) was placed on top of the composition and the two materials were quickly mixed with a spatula and spread out on the plate as a thin film. Within 5–10 seconds of the addition of the acetonitrile, each plate was exposed to the radiation from a 222-nanometer excimer lamp assembly. The assembly consisted of a bank of four cylindrical lamps having a length of about 30 cm. The lamps were cooled by circulating water through a centrally located or inner tube of the lamp and, as a consequence, they operated at a relatively low temperature, i.e., about 50° C. The power density at the lamp's outer surface typically was in the range of from about 4 to about 20 joules per square meter ($J/m^2$). However, such range in reality merely reflects the capabilities of current excimer lamp power supplies; in the future, higher power densities may be practical. The distance from the lamp to the sample being irradiated was 4.5 cm. The time for each film to become colorless to the eye was measured. The results are summarized in Table 6.

TABLE 6

Decolorization Times for Various Compositions

| Composition | Decolorization Times (Seconds) |
|---|---|
| Example 20 | 1 |
| Example 21 | 3–4 |
| Example 12 | 7–8 |

While the data in Table 6 demonstrate the clear superiority of the colored compositions of the present invention, such data were plotted as degree of substitution versus decolorization time. The plot not only demonstrates the significant improvement of the colored compositions of the present invention when compared with compositions having a degree of substitution less than three, but also indicates that a degree of substitution of about 6 is about optimum. That is, little if any improvement in decolorization time would be achieved with degrees of substitution greater than about 6.

EXAMPLE 23

This example describes the preparation of a complex consisting of a mutable colorant and the derivatized molecular includant of Example 17.

The procedure of Example 20 was repeated, except that the functionalized molecular includant of Example 17 was replaced with 10 g (4.8 mmoles) of the derivatized molecular includant of Example 17 and the amount of Victoria Pure Blue BO was reduced to 2.5 g (4.8 mmoles). The yield of washed solid was 10.8 g (86 percent) of a mutable colorant associated with the β-cyclodextrin having an average of six tosyl groups per molecule of molecular includant.

EXAMPLE 24

This example describes the preparation of a colored composition which includes a mutable colorant and a functionalized molecular includant.

The procedure of preparing a functionalized molecular includant of Example 17 was repeated, except that the tosylated β-cyclodextrin was replaced with 10 g (3.8 mmoles) of the complex obtained in Example 23 and the amount of the derivatized ultraviolet radiation transorber prepared in Example 17 was 11.6 g (27 mmoles). The amount of colored composition obtained was 11.2 g (56 percent). The average degree of substitution was determined as described above, and was found to be 5.9, or about 6.

Having thus described the invention, numerous changes and modifications hereof will be readily apparent to those having ordinary skill in the art, without departing from the spirit or scope of the invention.

We claim:

1. A pre-dye {composition} comprising a dye covalently bound to a radiation transorber adapted so that the pre-dye is colorless and will form a color when irradiated with radiation, the radiation transorber comprising a wavelength-selective sensitizer covalently bonded to a reactive species-generating photoreactor wherein the photoreactor, is 1-[4-(2-hydroxyethoxy)phenyl]-2-hydroxy-2-methyl-propan-1-one having the following formula

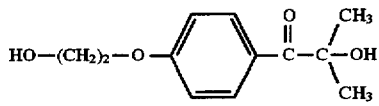

or 1-hydroxycyclohexane phenyl ketone having the following formula

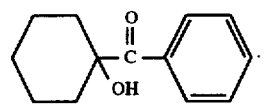

2. The pre-dye {composition} of claim 1, wherein the dye is an aminotriarylmethane {or a derivative thereof } dye.

3. A method of developing a color comprising:
providing a {composition} pre-dye comprising a dye covalently bound to a radiation transorber adapted so that the pre-dye is colorless and will form a color when irradiated with radiation, the radiation transorber comprising a wavelength-selective sensitizer covalently bonded to a reactive species-generating photoreactor; and irradiating the {composition} pre-dye with radiation at a wavelength and dosage level sufficient to irreversibly mutate the {colorant} pre-dye, wherein the photoreactor is 1-[4-(2-hydroxyethoxy)phenyl]-2-hydroxy-2-methyl-propan-1-one having the following formula

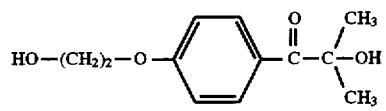

or 1-hydroxycyclohexane phenyl ketone having the following formula

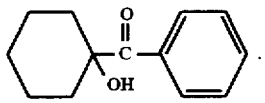

4. The method of claim 3, wherein the dye is an aminotriarylmethane {or a derivative thereof} dye.

5. The method of claim 3, wherein the radiation is ultraviolet radiation with a wavelength of between about 100 to about 375 nanometers, depending upon the radiation transorber that is present the pre-dye.

6. A mutable dye composition comprising a leuco dye admixed with a radiation transorber {comprising}, wherein the radiation transorber comprises a wavelength-selective sensitizer covalently bonded to a reactive species-generating photoreactor, wherein the photoreactor is 1-[4-(2-hydroxyethoxy)phenyl]-2-hydroxy-2-methyl-propan-1-one having the following formula

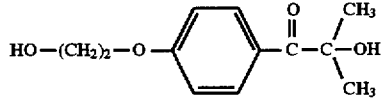

or 1-hydroxycyclohexane phenyl ketone having the following formula

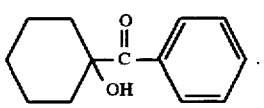

7. The mutable dye composition of claim 6, wherein the dye is a leuco {aminoarylmethane or a derivative thereof} aminotriarylmethane dye.

8. A method of developing a color comprising:

providing a composition comprising a leuco dye admixed with a radiation transorber {comprising}, wherein the radiation transorber comprises a wavelength-selective sensitizer covalently bonded to a reactive species-generating photoreactor; and irradiating the composition with radiation at a wavelength and dosage level sufficient to irreversibly mutate the {colorant} leuco dye, wherein the photoreactor is 1-[4-(2-hydroxyethoxy) phenyl]-2-hydroxy-2-methyl-propan-1-one having the following formula

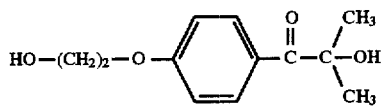

or
1-hydroxycyclohexane phenyl ketone having the following formula

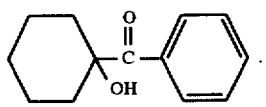

9. The method of claim 8, wherein the dye is a leuco {aaminoarylmethane or a derivative thereof} aminotriaryl-methane dye.

10. The method of claim 8, wherein the radiation is ultraviolet radiation with a wavelength of between about 100 to about 375 nanometers, depending upon the radiation transorber that is present the composition.

11. A pre-dye comprising a dye covalently bound to a radiation transorber adapted so that the pre-dye is colorless and will form a color when irradiated with radiation, the radiation transorber comprising a wavelength-selective sensitizer covalently bonded to a reactive species-generating photoreactor, wherein the wavelength-selective sensitizer is phthaloylglycine having the following formula

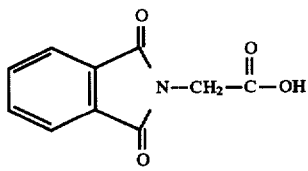

or
4-(4-Hydroxy phenyl) butan-2-one having the following formula

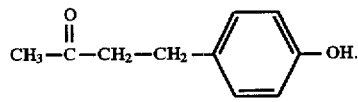

12. The pre-dye of claim 11, wherein the radiation transorber is 2-(p-(2-methyllactoyl)phenoxy)ethyl 1,3-dioxo-2-isoindoline-acetate having the formula

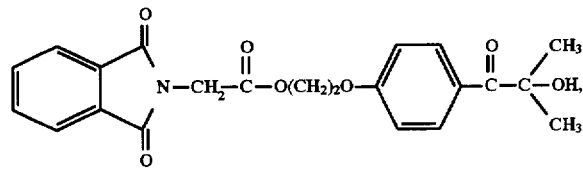

phthaloylglycyl-cyclohexylphenyl ketone ester having the formula

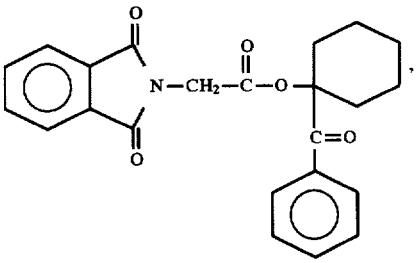

4-(4-oxyphenyl)-2-butanone-1-(4-(2-oxyethoxy)phenyl)-2-hydroxy-2-methyl-propan-1-one (or 2-hydroxy-2-methyl-4'-(2-(p-(3-oxobutyl) phenoxy)ethoxy)-propiophenone) having the formula

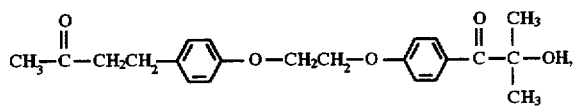

or 4-(4-oxyphenyl)-2-butanonecyclohexyl-phenyl ketone (or 4-(p-((4-benzoylcyclohexyl) oxy)phenyl)-2-butanone) having the formula

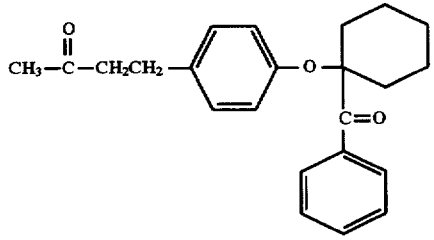

13. A pre-dye comprising a dye covalently bound to a radiation transorber adapted sot that the pre-dye is colorless and will form a color when irradiated with radiation, the radiation transorber comprising a wavelength-selective sensitizer covalently bonded to reactive species-generating photoreactor, wherein the pre-dye has the formula

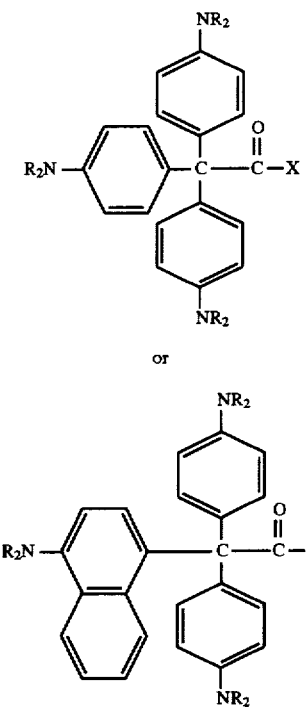
or
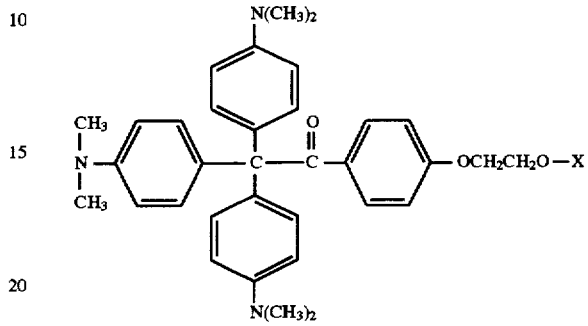
wherein X represents the radiation transorber, and wherein R represents a hydrogen, methyl, or ethyl group.
14. The pre-dye of claim 13, wherein the dye is crystal violet, and the pre-dye has the following formula
wherein X represents a radiation transorber or a wavelength-specific sensitizer.
15. The pre-dye of claim 14, wherein the pre-dye has the formula
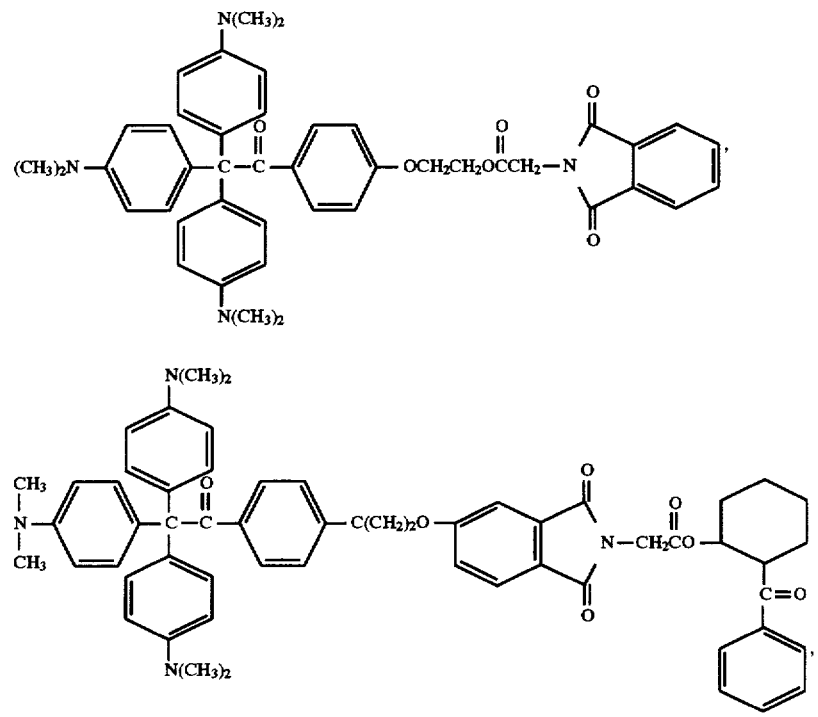

-continued

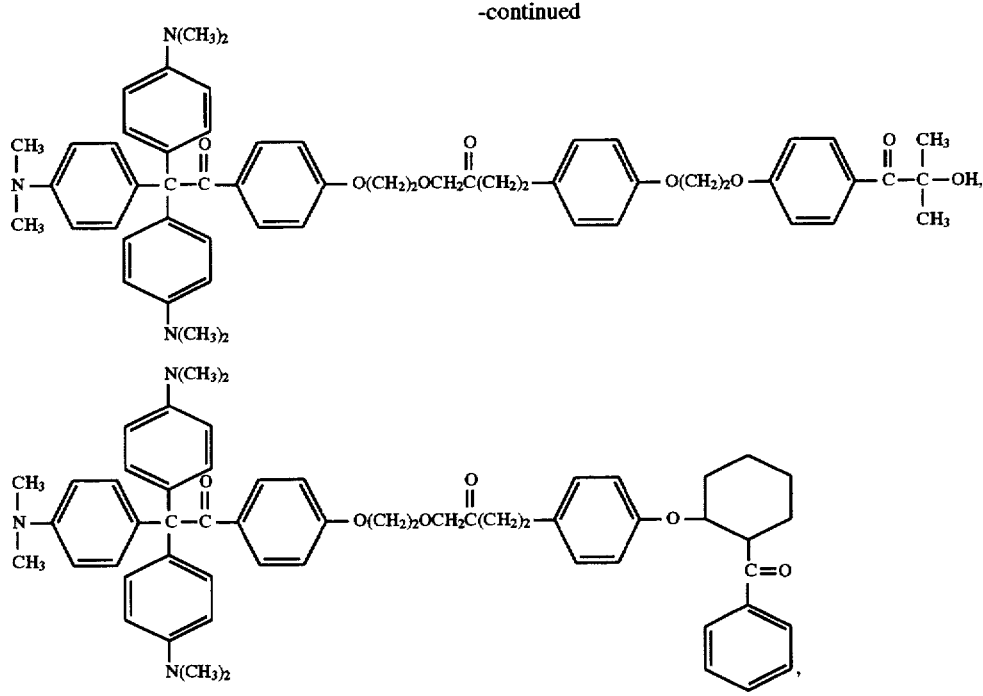

or

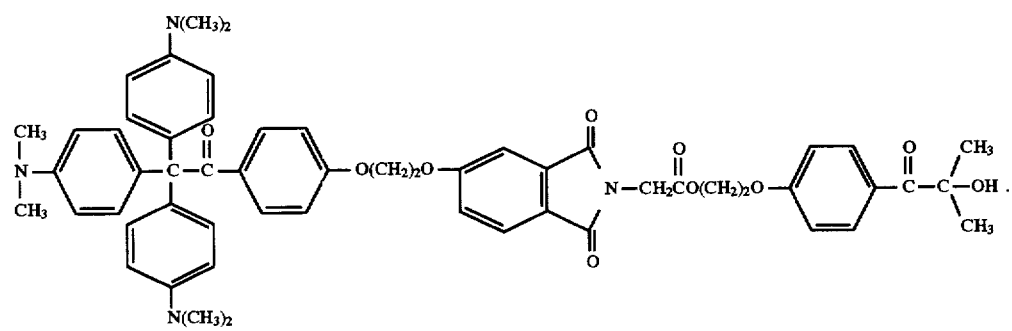

16. A method of developing a color comprising:

providing a pre-dye comprising a dye covalently bound to a radiation transorber adapted so that the pre-dye is colorless and will form a color when irradiated with radiation, the radiation transorber comprising a wavelength-selective sensitizer covalently bonded to a reactive species-generating photoreactor; and irradiating the pre-dye with radiation at a wavelength and dosage level sufficient to irreversibly mutate the pre-dye, wherein the wavelength-selective sensitizer is phthaloylglycine having the following formula

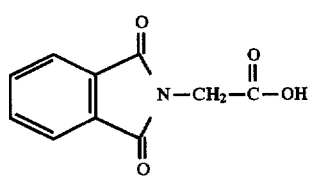

or 4-(4-Hydroxy phenyl) butan-2-one having the following formula

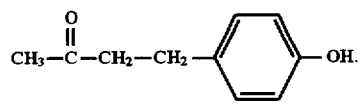

17. The method of claim 16, wherein the radiation transorber is 2-(p-(2-methyllactoyl)phenoxy)ethyl 1,3-dioxo-2-isoindoline-acetate having the formula

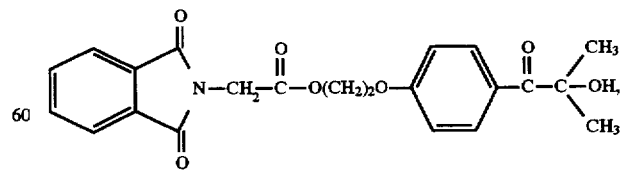

phthaloylglycyl-cyclohexylphenyl ketone ester having the formula

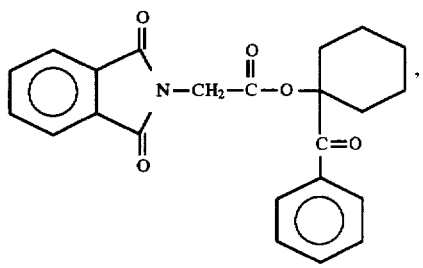

4-(4-oxyphenyl)-2-butanone-1-(4-(2-oxyethoxy)phenyl)-2-hydroxy-2-methyl-propan-1-one (or 2-hydroxy-2-methyl-4'-(2-(p-(3-oxobutyl) phenoxy)ethoxy)-propiophenone) having the formula

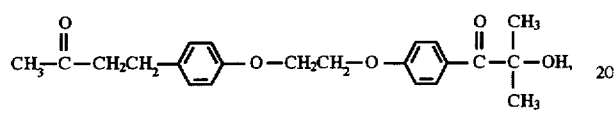

or 4-(4-oxyphenyl)-2-butanonecyclohexyl-phenyl ketone (or 4-(p-((4-benzoylcyclohexyl) oxy)phenyl)-2-butanone) having the formula

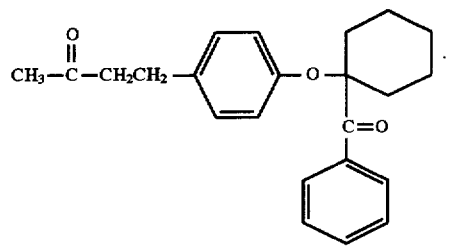

18. The method of claim 16, wherein the radiation is ultraviolet radiation with a wavelength of between about 100 to about 375 nanometers, depending upon the radiation transorber that is present the pre-dye.

19. A method of developing a color comprising:
providing a pre-dye comprising a dye covalently bound to a radiation transorber adapted so that the pre-dye is colorless and will form a color when irradiated with radiation, the radiation transorber comprising a wavelength-selective sensitizer covalently bonded to a reactive species-generating photoreactor; and
irradiating the pre-dye with radiation at a wavelength and dosage level sufficient to irreversibly mutate the pre-dye, wherein the pre-dye has the formula

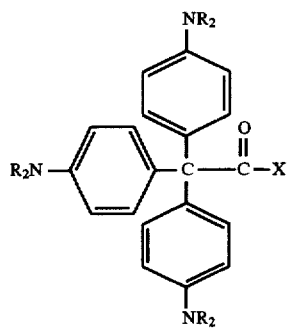

or

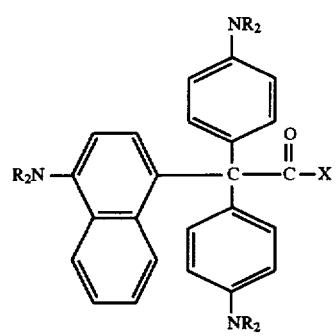

wherein X represents the radiation transorber, and wherein R represents a hydrogen, methyl, or ethyl group.

20. The method of claim 19, wherein the dye is crystal violet, and the pre-dye has the following formula

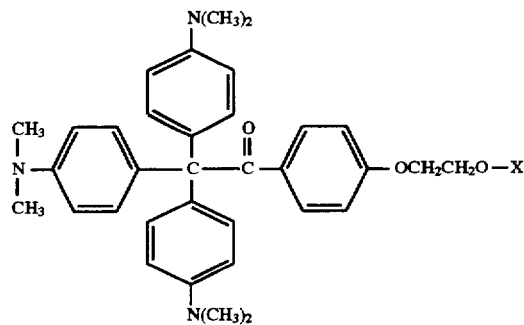

wherein X represents a radiation transorber or a wavelength-specific sensitizer.

21. The method of claim 20, wherein the pre-dye has the formula

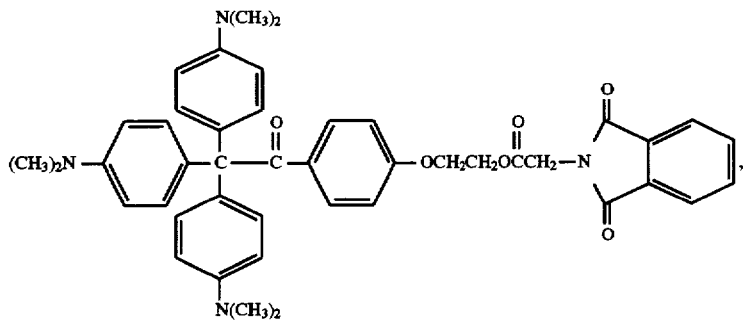

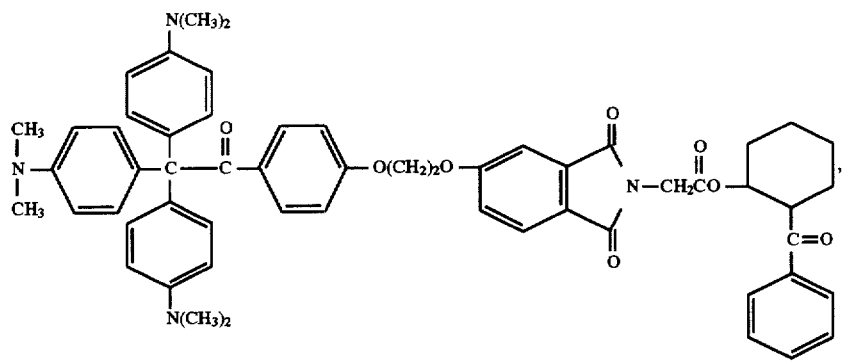
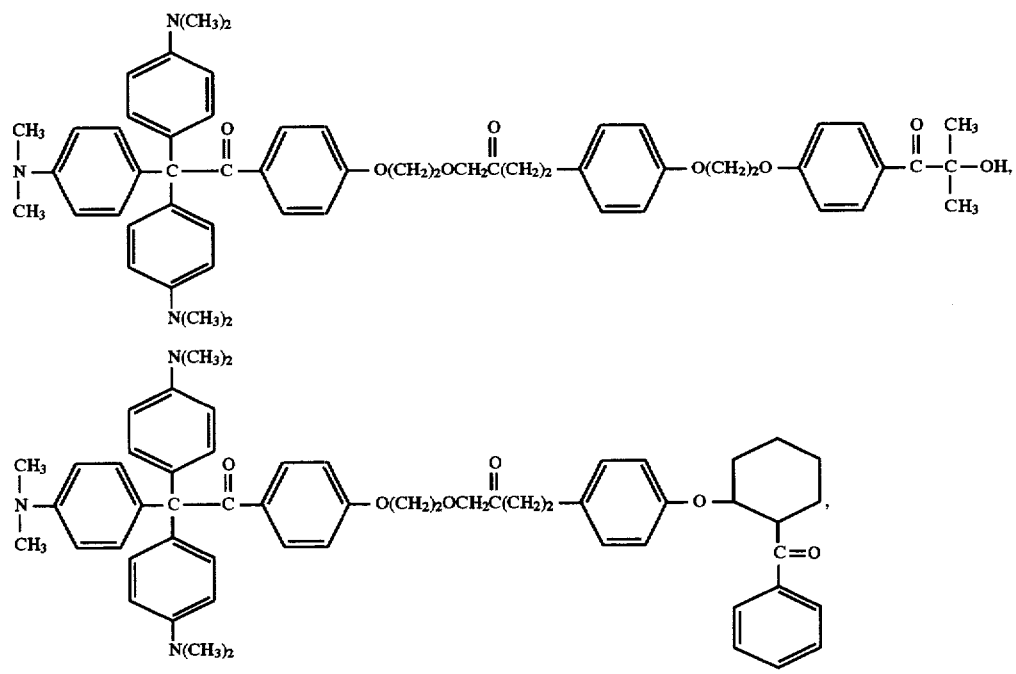
or
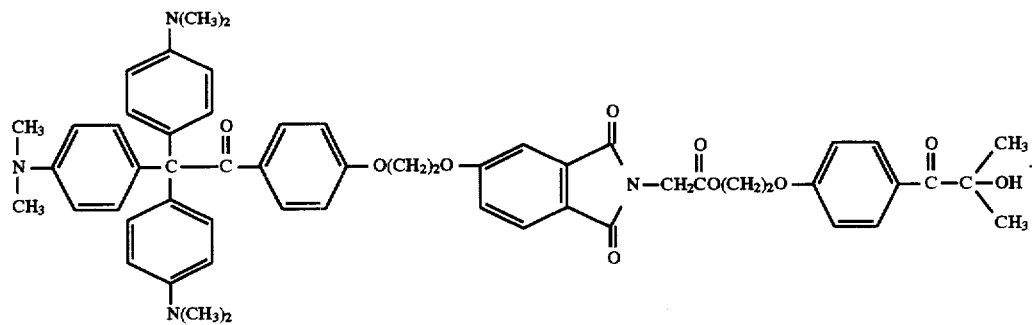
22. A mutable dye composition comprising a leuco dye admixed with a radiation transorber comprises a wavelength-selective sensitizer covalently bonded to a reactive species-generating photoreactor, wherein the wavelength-selective sensitizer is phtaloylglycine having the following formula

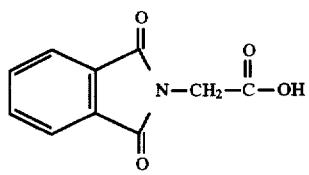

or 4-(4-Hydroxy phenyl) butan-2-one having the following formula

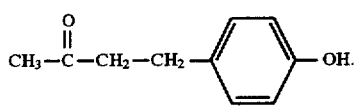

23. The mutable dye composition of claim 22, wherein the radiation transorber is 2-(p-(2-methyllactoyl)phenoxy)ethyl 1,3-dioxo-2-isoindoline-acetate having the formula

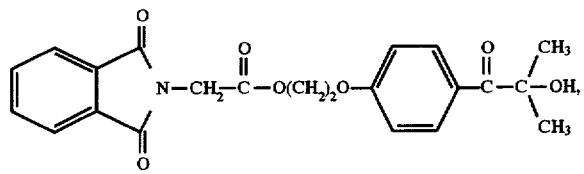

phthaloylglycyl-cyclohexylphenyl ketone ester having the formula

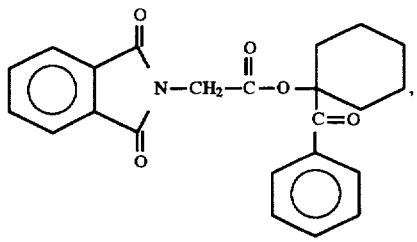

4-(4-oxyphenyl)-2-butanone-1-(4-(2-oxyethoxy)phenyl)-2-hydroxy-2-methyl-propan-1-one (or 2-hydroxy-2-methyl-4'-(2-(p-(3-oxobutyl) phenoxy)ethoxy)-propiophenone) having the formula

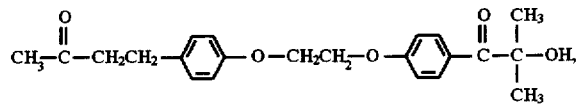

or 4-(4-oxyphenyl)-2-butanonecyclohexyl-phenyl ketone (or 4-(p-((4-benzoylcyclohexyl) oxy)phenyl)-2-butanone) having the formula

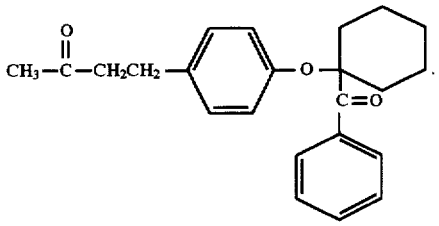

24. A method of developing a color comprising:
providing a composition comprising a leuco dye admixed with a radiation transorber, wherein the radiation transorber comprises a wavelength-selective sensitizer covalently bonded to a reactive species-generating photoreactor; and
irradiating the composition with radiation at a wavelength and dosage level sufficient to irreversibly mutate the leuco dye, wherein the wavelength-selective sensitizer is phthaloylglycine having the following formula

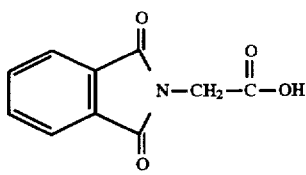

or
4-(4-Hydroxy phenyl) butan-2-one having the following formula

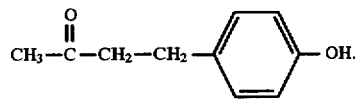

25. The method of claim 24, wherein the radiation transorber is 2-(p-(2-methyllactoyl)phenoxy)ethyl 1,3-dioxo-2-isoindoline-acetate having the formula

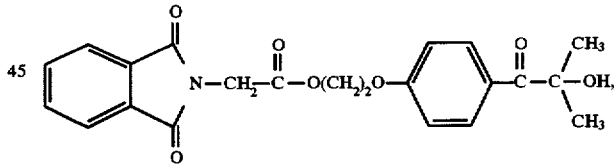

phthaloylglycyl-cyclohexylphenyl ketone ester having the formula

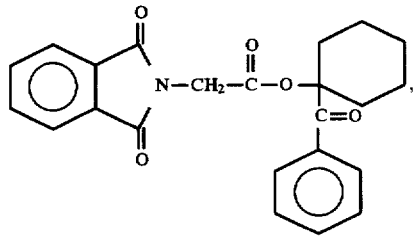

4-(4-oxyphenyl)-2-butanone-1-(4-(2-oxyethoxy)phenyl)-2-hydroxy-2-methyl-propan-1-one (or 2-hydroxy-2-methyl-4'-(2-(p-(3-oxobutyl) phenoxy)ethoxy)-propiophenone) having the formula 47
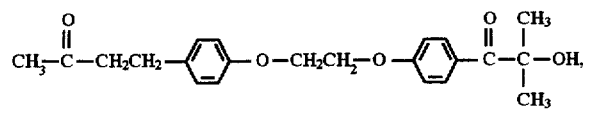
or
4-(4-oxyphenyl)-2-butanonecyclohexyl-phenyl ketone (or 4-(p-((4-benzoylcyclohexyl) oxy)phenyl)-2-butanone) having the formula
48
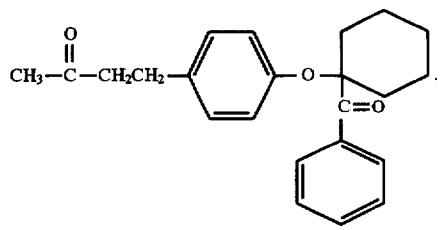
26. The method of claim 24, wherein the radiation is ultraviolet radiation with a wavelength of between about 100 to about 375 nanometers, depending upon the radiation transorber that is present the composition.
* * * * *